US008164720B2

(12) United States Patent
Adachi et al.

(10) Patent No.: US 8,164,720 B2
(45) Date of Patent: Apr. 24, 2012

(54) LIQUID CRYSTAL DISPLAY APPARATUS

(75) Inventors: Masaya Adachi, Hitachi (JP); Shintaro Takeda, Hitachi (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 833 days.

(21) Appl. No.: 12/184,275

(22) Filed: Aug. 1, 2008

(65) Prior Publication Data

US 2009/0284693 A1    Nov. 19, 2009

(30) Foreign Application Priority Data

Aug. 3, 2007  (JP) ................................. 2007-202603

(51) Int. Cl.
*G02F 1/1335* (2006.01)
(52) U.S. Cl. ........... 349/114; 349/141; 349/98; 349/138
(58) Field of Classification Search .................. 349/114, 349/141, 96, 98, 139, 138
See application file for complete search history.

(56) References Cited

U.S. PATENT DOCUMENTS

| 7,880,836 B2 * | 2/2011 | Kimura et al. ................. 349/114 |
| 2006/0170846 A1 | 8/2006 | Ozawa |
| 2007/0013773 A1 | 1/2007 | Tsuchiya |
| 2008/0007666 A1 | 1/2008 | Takeda et al. |
| 2008/0316403 A1 | 12/2008 | Ozawa |

FOREIGN PATENT DOCUMENTS

| JP | 2003-207795 A | 7/2003 |
| JP | 2006-003840 | 1/2006 |
| JP | 2006-215287 | 8/2006 |
| JP | 2007-047732 | 2/2007 |
| JP | 2008-033311 | 2/2008 |

OTHER PUBLICATIONS

U.S. Appl. No. 12/019,708, filed Jan. 25, 2008, Kajita et al.
U.S. Appl. No. 12/019,031, filed Jan. 24, 2008, Kajita et al.
W.H. de Jeu, "Physical Properties of Liquid Crystals", pp. 90-94.
Coles et al., "Liquid crystal 'blue phases' with a wide temperature range", Nature, vol. 436, pp. 997-1000, Aug. 2005.
Yoshizawa et al., "A blue phase observed for a chiral compound possessing molecular biaxiality", Hournal of Materials Chemistry, Vo. 15, pp. 3285-3290, Jul. 2005.

(Continued)

*Primary Examiner* — Thoi Duong
(74) *Attorney, Agent, or Firm* — Antonelli, Terry, Stout & Kraus, LLP.

(57) ABSTRACT

A liquid crystal display apparatus includes a liquid crystal display panel having a first substrate, a second substrate, a liquid crystal layer held in a sandwiched condition between the substrates, and a pixel electrode and common electrode disposed on the second substrate in order to drive the liquid crystal layer. A backlight is disposed on one face of the liquid crystal display panel, a first polarizer disposed on one face of the first substrate, at a side opposite to the second substrate, and a second polarizer disposed on one face of the second substrate, at a side opposite to the first substrate. The liquid crystal layer has a property of generating optically anisotropy from an optical isotropic state when a voltage is applied, and the liquid crystal display panel includes a transmission area and a reflection area in one pixel.

7 Claims, 14 Drawing Sheets

OTHER PUBLICATIONS

Hisakado et al., "Large Electric-optic Kerr Effect in Polymer-Stabilized Liquid-Crystalline Blue Phase" Advance Materials, vol. 17, pp. 96-98, Jan. 2005.

Acharya et al., "The Bent-Core Biaxial Nematic Phase", Liquid Crystals Today, vol. 13, No. 1, pp. 1-4, Mar. 2004.

Ukai et al., "Invited Paper: Current Status and Future Prospect of In-Cell Polarizer Technology", SID 04 Digest, pp. 1170-1173, 2004.

Khan et al., "Ultra-Thin O-Polarizers' Superiority over E-Polarizers for LCD's", SID 04 Digest, pp. 1316-1319, 2004.

* cited by examiner

LIQUID CRYSTAL DISPLAY APPARATUS

BACKGROUND OF THE INVENTION

1. Field of the Invention

The present invention relates generally to liquid crystal display apparatus that uses an optically isotropic liquid crystal material, and more particularly to a transflective type of liquid crystal display apparatus.

2. Description of the Related Art

Display apparatus is a medium that visually conveys information to humans, and in the modern age with an advanced information society, the display apparatus is an entity important to humans and society. In recent years, liquid crystal display apparatus, in particular, has significantly improved in performance, and is adopted as display devices for a variety of products from hand-held telephones to personal computers and even to large-screen televisions and the like. Liquid crystal displays generally comprise a liquid crystal display panel and a backlight (illuminating device) disposed on the rear face of the liquid crystal display panel in order to irradiate this panel with light. For color image display, one pixel comprises three subpixels associated with, for example, the three primary colors (red, blue, and green), and the subpixels associated with each color are each independently controlled to reproduce various colors.

Because of its applicability to a wide range of illuminating environments, transflective-type liquid crystal display apparatus is used as liquid crystal displays in hand-held telephones or other mobile communication apparatus. The transflective type of liquid crystal display apparatus has a transmission area and a reflection area in one subpixel forming the display area of the liquid crystal display panel. The transmission area is provided to implement transmissive display by controlling the amount of transmission of the light emitted from the backlight. The reflection area is provided to achieve reflective display by controlling the amount of ambient light transmitted. That is to say, the transflective type of liquid crystal display apparatus can be used in a wide variety of illuminating environments since the display apparatus ensures the visibility of display images by achieving transmissive display primarily in dark environments, and reflective display primarily in bright environments. Liquid crystal displays of the IPS (In-Plane Switching) scheme are traditionally known to provide wide viewing angles. Liquid crystal displays of other schemes such as the VA (Vertical Alignment) scheme or TN (Twisted Nematic) scheme are also known. Irrespective of the kind of scheme adopted, each liquid crystal display comprising one pair of transparent substrates, a liquid crystal layer held in sandwiched form between the pair of transparent substrates and formed of a nematic liquid crystal material, and one pair of polarizers disposed on the respective faces of each transparent substrate that are formed at positions opposite to the liquid crystal layer, controls the amount of transmission of light by changing the polarization state of the light entering the liquid crystal layer, and thus displays an image.

As described in Non-Patent Document 1 listed below, nematic liquid crystal materials exhibit a light-scattering behavior due to thermal fluctuation of molecules. In both the IPS scheme and the VA scheme, display panels that employ a nematic liquid crystal material assume a black state when no voltage is applied. During operation, the corresponding display apparatus, whether it be of the IPS or VA scheme, is reduced in contrast ratio by leakage of light due to the scattering thereof. The reduction in contrast ratio is among the characteristic problems of the nematic liquid crystal materials.

In contrast to this, liquid crystal materials with optically three-dimensional or two-dimensionally optical isotropy are known in recent years (hereinafter, these materials are referred to simply as isotropic liquid crystal materials). These isotropic liquid crystal materials have the properties that when no voltage is applied to the liquid crystal layer, the liquid crystal molecules aligned will have optically three-dimensional or two-dimensionally optical isotropy, and that when an electric field is formed by the application of a voltage, birefringence will be induced in the direction of the electric field. The kinds of isotropic liquid crystal materials reported in recent years include a three-dimensionally isotropic type exhibiting a smectic blue phase or a cholesteric blue phase. These kinds of materials further include a two-dimensionally isotropic type having a bent-core structure. The type with the bent-core structure has a liquid crystal compound aligned vertically with respect to the substrates, and exhibits isotropy in the plane of the liquid crystal layer under no voltage. Other known materials include those which exhibit either a cubic phase, a smectic Q-phase, a micelle phase, a reverse micelle phase, a sponge phase, or the like.

Materials of the blue phases have traditionally been extremely narrow in applicable temperature range, and hence, low in practical applicability. Non-Patent Documents 2 and 3 listed below describe the extension of the applicable temperature ranges in the materials of the blue phases. Also, Non-Patent Document 4 listed below describes isotropic liquid crystal materials and the properties thereof, such as optical biaxiality in the bent-core structure. Non-Patent Document 5 below describes the optical elements that use an isotropic liquid crystal.

Additionally, JP-A-2006-3840 discloses a detailed electrode structure of a liquid crystal display panel using an isotropic liquid crystal. In JP-A-2006-215287 disclosing a transflective liquid crystal display apparatus that uses an isotropic liquid crystal, it is described that the apparatus is configured so that an electric field in a reflection area is weaker than that of a transmission area. More specifically, it is described that the distance between a plurality of electrodes constructed to form an electric field essentially parallel to a substrate surface is changed to differ between the reflection area and the transmission area.

Non-Patent Document 1: Physical Properties of Liquid crystals, pp. 90-94, written by W. H. de Jeu, translated by Chikara Ishii and Shunsuke Kobayashi Non-Patent Document 2: Harry J. Coles, NATURE, Vol. 436, pp. 997-1000, 2005

Non-Patent Document 3: Atsushi Yoshizawa et al., Journal of Materials Chemistry, Vo. 15, pp. 3285-3290, 2005

Non-Patent Document 4: Bharat R. Archarya et al., LIQUID CRYSTALS TODAY, VOL. 13, No. 1, pp. 1-4, 2004

Non-Patent Document 5: Hirotsugu Kikuchi, Advanced Materials, Vol. 17, pp. 96-98, 2005

SUMMARY OF THE INVENTION

According to above JP-A-2006-215287, since the electric field in the reflection area is made weaker than that of the transmission area, the distance between the plurality of electrodes constructed to form an electric field essentially parallel to the substrate surface is caused to differ between the reflection area and the transmission area. The number of electrodes which can be provided for one pixel in the corresponding display apparatus is limited according to the particular accuracy of its manufacturing apparatus such as an exposure apparatus. For a high-resolution liquid crystal display apparatus, in particular, the size of pixels decreases, so several electrodes can only be provided in one pixel of space. This, in turn, limits the achievable inter-electrode clearances, making it difficult for the relationship in the magnitude of the electric field strength between the reflection area and the transmission area to satisfy desired conditions.

In addition, as discussed above, the properties of isotropic liquid crystals that differ from those of conventional liquid crystals are coming to be elucidated, but the structure of the display apparatus applying the above liquid crystal material is not fully studied.

Hence, the present invention has been made with the above problems in view, and an object of the invention is to achieve a transflective liquid crystal display apparatus that uses an isotropic liquid crystal capable of providing bright display, even at a small pixel size. Another objective is to realize a structure suitable for effectively using an isotropic liquid crystal in a display apparatus.

A liquid crystal display apparatus according to the present invention comprises: a liquid crystal display panel including a first substrate, a second substrate, a liquid crystal layer held in a sandwiched condition between the substrates, and a pixel electrode and common electrode disposed on the second substrate in order to drive the liquid crystal layer; a backlight disposed on one face of the liquid crystal display panel; a first circular polarizer disposed on one face of the first substrate, at a side opposite to the second substrate; and a second circular polarizer disposed on one face of the second substrate, at a side opposite to the first substrate. The liquid crystal layer has a property of generating optical anisotropy from an optical isotropic state when a voltage is applied. The liquid crystal display panel includes a transmission area and a reflection area in one pixel. In the reflection area, one of the pixel electrode and the common electrode is formed into a comb shape or includes a slit-shaped aperture in an electrode layer formed into a planar shape, and the other electrode is formed planarly on a different layer via an insulation layer. In the transmission area, the pixel electrode and the common electrode are formed into a comb shape on the same layer, and the pixel electrode and the common electrode are disposed at alternate positions, such that an electric field formed in the liquid crystal layer according to a particular voltage difference between the pixel electrode and the common electrode will be weaker in the reflection area than in the transmission area.

Also, in the present invention, of the pixel electrode and the common electrode, the electrode formed at a side closer to the liquid crystal layer is formed into a comb shape or includes a slit-shaped aperture in an electrode layer formed into a planar shape, and the other electrode is formed on a different layer via an insulation layer, such that thickness of the insulation layer in the reflection area is greater than thickness of the insulation layer in the transmission area.

Additionally, in the present embodiment, in the transmission area, of the pixel electrode or the common electrode, the electrode formed at a side more distant from the liquid crystal layer is planarly formed, whereas in the reflection area, of the pixel electrode or the common electrode, the electrode formed at a side more distant from the liquid crystal layer includes an aperture in a planarly formed electrode layer.

Another liquid crystal display apparatus according to the present invention comprises: a liquid crystal display panel including a first substrate, a second substrate, a liquid crystal layer held in a sandwiched condition between the substrates, and a pixel electrode and common electrode disposed on the second substrate in order to drive the liquid crystal layer; a backlight disposed on one face of the liquid crystal display panel; a first polarizer disposed on one face of the first substrate, at a side opposite to the second substrate; and a second polarizer disposed on one face of the second substrate, at a side opposite to the first substrate. The liquid crystal layer has a property of generating optical anisotropy from an optical isotropic state when a voltage is applied. The liquid crystal display panel includes a transmission area and a reflection area in one pixel. In the reflection area, one of the pixel electrode and the common electrode is formed into a comb shape or includes a slit-shaped aperture in an electrode layer formed into a planar shape, with the other electrode being formed planarly on a different layer via an insulation layer, and an electric field formed in the liquid crystal layer according to a particular voltage difference between the pixel electrode and the common electrode will be weaker in the reflection area than in the transmission area. In the reflection area, the display panel further includes an in-cell retardation layer between the liquid crystal layer and the first or second substrate.

Yet another liquid crystal display apparatus according to the present invention comprises: a liquid crystal display panel including a first substrate, a second substrate, a liquid crystal layer held in a sandwiched condition between the substrates, and a pixel electrode and common electrode disposed on the second substrate in order to drive the liquid crystal layer; a backlight disposed on one face of the liquid crystal display panel; a first polarizer disposed on one face of the first substrate, at a side opposite to the second substrate; and a second polarizer disposed on one face of the second substrate, at a side opposite to the first substrate. The liquid crystal layer has a property of generating optical anisotropy from an optical isotropic state when a voltage is applied. The liquid crystal display panel includes a transmission area and a reflection area in one pixel; in the reflection area, the display panel includes a reflective layer between the pixel electrode, the common electrode, and the second substrate, and at least in the reflection area, further includes a polarizing layer between the reflective layer and the liquid crystal layer. The first polarizer has an absorption axis perpendicular to an absorption axis of the second polarizer, and the polarizing layer has an absorption axis parallel to the absorption axis of the second polarizer.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Figure 1:
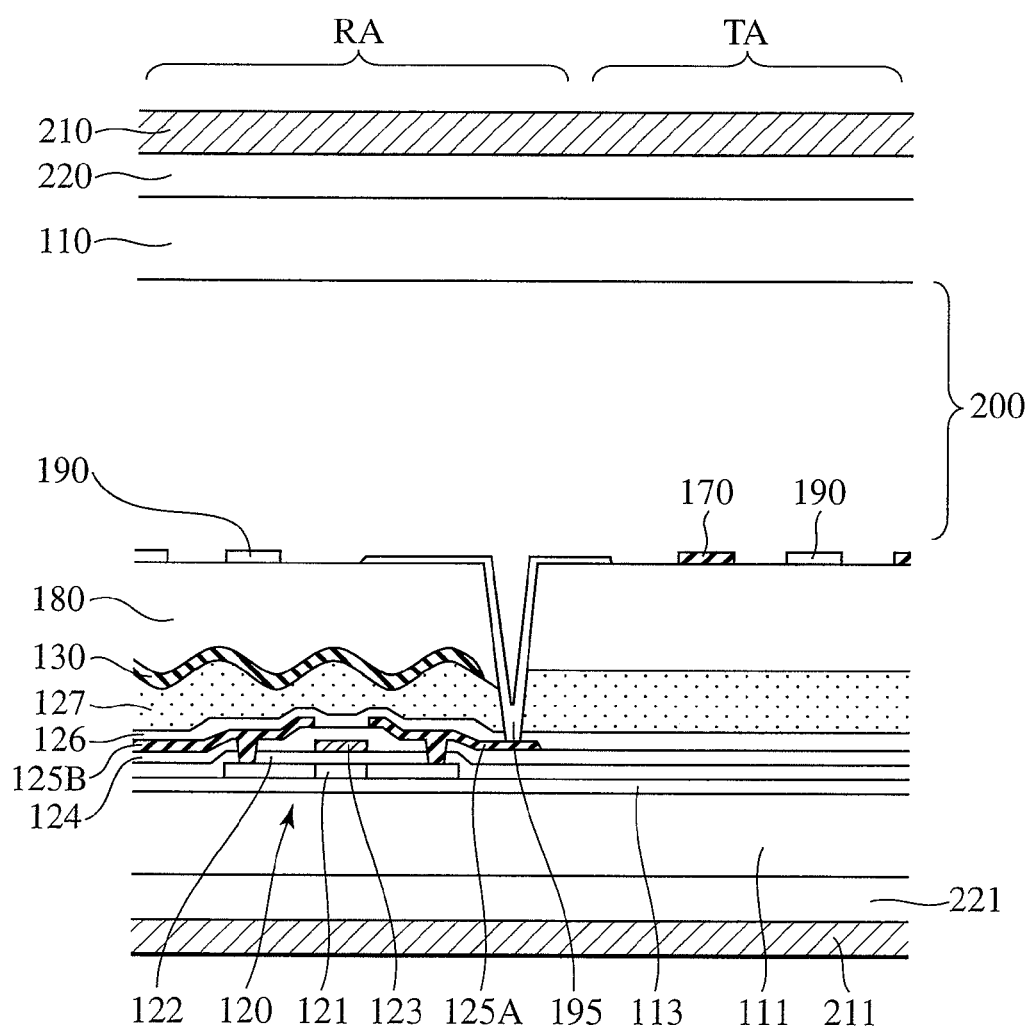
FIG. 1 is a cross-sectional view showing a schematic configuration of an essential section of a subpixel in a liquid crystal display panel which forms part of a transflective liquid crystal display panel according to the present invention.

Transflective liquid crystal display apparatus configurations suitable for an isotropic liquid crystal will be described in order below.

Liquid Crystal Display Panel and Basic Liquid Crystal Display Apparatus Configuration A structure of a transflective liquid crystal display panel using an isotropic liquid crystal is first described. The liquid crystal display panel has two transparent substrates and a liquid crystal layer held in a sandwiched condition therebetween, generates an electric field between a pixel electrode and common electrode disposed on each substrate, and changes the electric field in strength to control optical characteristics of the liquid crystal layer. In this panel structure, the isotropic liquid crystal is optically isotropic when no voltage is applied, and induces birefringence in a direction of the electric field formed when a voltage is applied. Because of these properties, to realize a transflective liquid crystal display panel using the isotropic liquid crystal, it is necessary to interpose the liquid crystal layer between two circular polarizers and realize a structure in which, when the voltage is applied to the liquid crystal layer, a retardation that the birefringence induced will cause to light passing through the liquid crystal layer will be substantially λ/2 in a transmission area and substantially λ/4 in a reflection area; λ is wavelength of the light, and the wavelength contributes to display.

To induce the birefringence in a parallel direction relative to the substrate surface when the voltage is applied to the liquid crystal layer, it is necessary to provide a structure that causes a potential difference in the direction parallel to the substrate surface. This requirement can be met by adopting a structure with two alternately arrayed comb electrodes capable of accepting different voltages, or a structure in which an electrode to be disposed at a side closer to the liquid crystal layer is formed into a comb shape or includes a slit-shaped aperture in a planar electrode layer, and a planar electrode is formed on another layer via an insulation layer.

As described above, realizing a transflective liquid crystal display apparatus requires constructing the display panel so that the application of a voltage to the liquid crystal layer causes a retardation (phase difference) between the reflection area and the transmission area. To this end, it is effective to make the thickness of the liquid crystal layer or the magnitude of the electric field strength differ between the reflection area and the transmission area.

A conventional known method of making the thickness of the liquid crystal layer differ between the reflection area and the transmission area is by increasing the thickness of a place equivalent to the reflection area, on at least one of the two substrates with the liquid crystal layer held therebetween in a sandwiched condition, that is, by providing a stepped section on the surface. In this case, the stepped surface will have an inclined end, which will become an area inappropriate for both transmissive display and reflective display, that is, an ineffective area not contributing to the improvement of display in brightness. In terms of the brightness of display, therefore, the above structure will be disadvantageous, particularly for the high-resolution liquid crystal display panels reduced in pixel size.

For the realization of a brighter liquid crystal display panel, therefore, it is desirable that the thickness of the liquid crystal layer be constant from the reflection area to the transmission area. For this purpose, it is effective to cause a difference in the magnitude of the electric field strength so that the birefringence induced in the liquid crystal layer will differ between the reflection area and the transmission area. A method available to cause a difference in the magnitude of the electric field strength is by changing an electrode layout pitch between the reflection area and the transmission area if pixel electrodes to be formed into the shape of a comb, and common electrodes also to be formed into the comb shape, are disposed at alternate positions.

In this case, the number of electrodes which can be provided in one pixel of space is limited according to the processing accuracy of the apparatus used to manufacture the display panel, such as an exposure apparatus. For a high-resolution liquid crystal display apparatus, in particular, the size of pixels decreases, so several electrodes can only be provided in one pixel of space. This, in turn, limits the achievable inter-electrode clearances, thus making it difficult for the relationship in the magnitude of the electric field strength between the reflection area and the transmission area to satisfy desired conditions.

The present invention employs the structure described below. The relationship in the magnitude of the electric field strength between the reflection area and the transmission area can therefore be controlled without being restricted by processing accuracy during the creation of a planar structure. This makes achievable a transflective liquid crystal display panel using an isotropic liquid crystal free from an ineffective area formed between the reflection area and the transmission area by the provision of a stepped section.

Hereunder, embodiments of the present invention will be described with reference being made to the accompanying drawings. However, various modifications and changes can be instituted and it is to be understood that the invention embraces combinations of the embodiments.

First Embodiment

Figure 2:
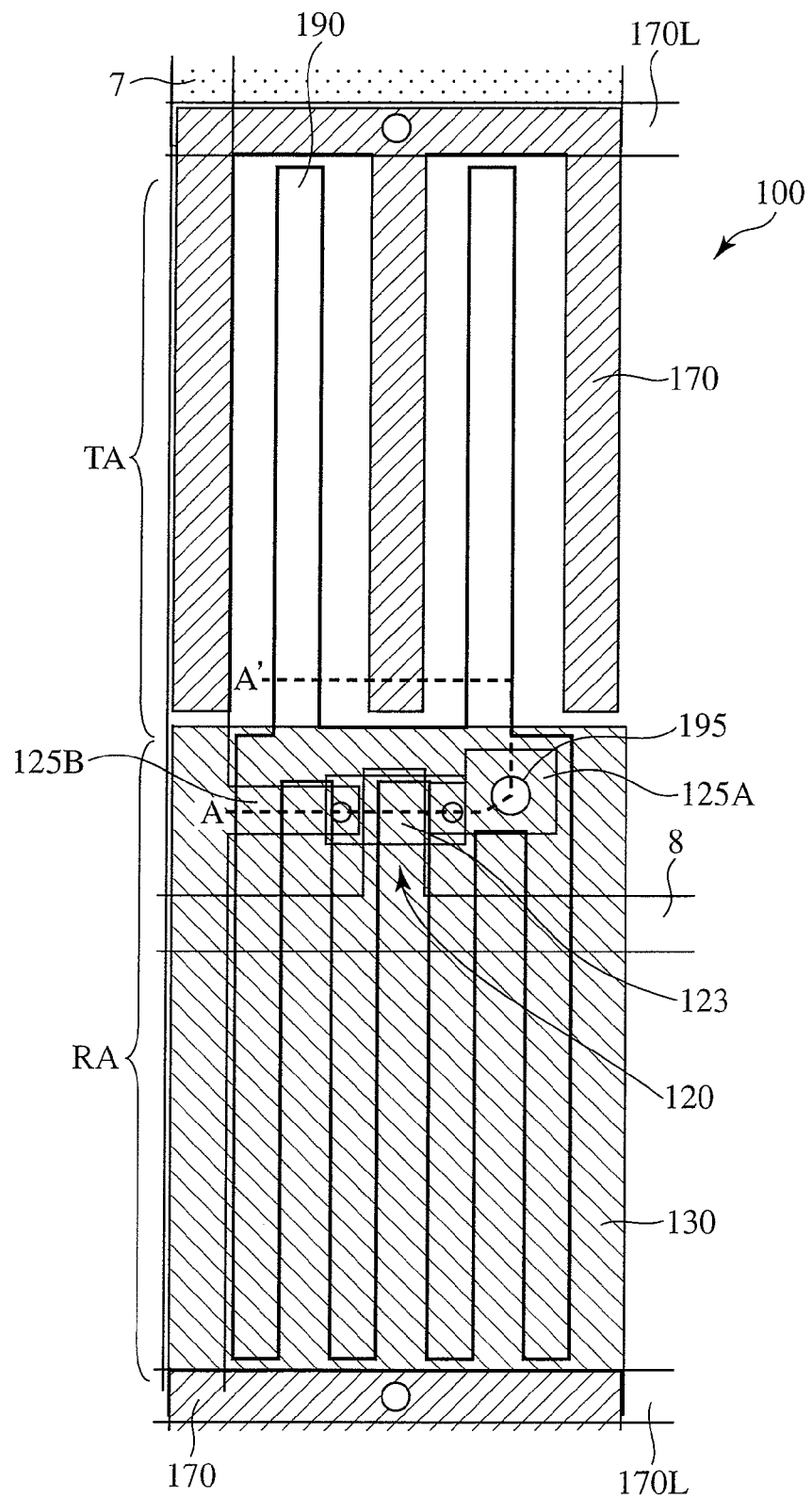
FIG. 2 is a plan view showing the schematic configuration of the essential section of the subpixel in the liquid crystal display panel of FIG. 1.
Figure 3:
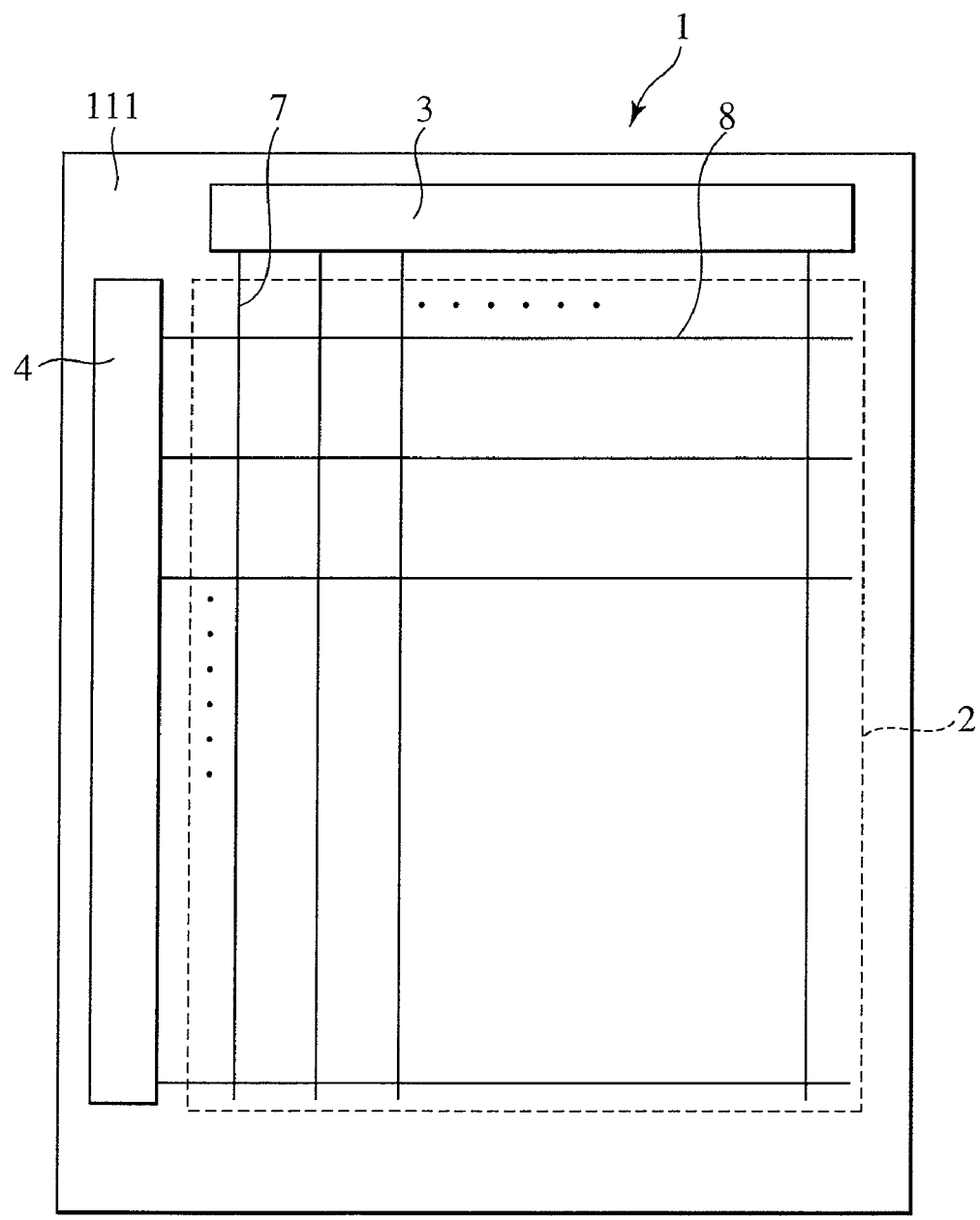
FIG. 3 is a block diagram showing schematically an example of layout of the entire transflective liquid crystal display panel of FIG. 1.

FIG. 1 is a cross-sectional view showing a schematic configuration of an essential section of a subpixel 100 in a liquid crystal display panel which forms part of a transflective liquid crystal display panel according to the present invention. Also, FIG. 2 is a plan view showing the schematic configuration of the essential section of the subpixel 100 in the liquid crystal display panel according to the present invention. FIG. 1 schematically illustrates a structure of section A-A' of FIG. 2. FIG. 3 is a block diagram showing schematically an example of layout of the entire transflective liquid crystal display panel 1 according to the present invention.

Referring first to FIG. 3, the liquid crystal display panel 1 has a display area 2 in an area including a central portion of a second transparent substrate 111. A data driver circuit 3 that outputs image signals to data lines (signal lines) 7 is disposed above the display area 2, located to the left of which is a scanning driver circuit 4 that outputs scanning signals to gate lines (scan lines) 8. The driver circuits 3, 4 include, for example, a shift register circuit, a level shifter circuit, and an analog switch circuit, each of which is further formed of a complementary circuit based on N-channel and P-channel thin-film transistors (TFTs). The liquid crystal display panel 1, as with a conventional liquid crystal display panel of an active-matrix driven type, includes a plurality of gate lines and a plurality of data lines extending in a crossing direction relative to a direction in which the gate lines extend, and subpixels are arranged in a matrix format at the intersections of each gate and each data line. As shown in FIGS. 1 and 2, each subpixel of space in the liquid crystal display panel 1 contains a transmission area TA and a reflection area RA.

Referring next to FIG. 1, the liquid crystal display panel 1 further includes a first transparent substrate 110 and a second transparent substrate 111, both formed from a transparent body having an insulating property, planarity, transparency, and optical isotropy. Although generally formed from glass, the first transparent substrate 110 and the second transparent substrate 111 can be a high-polymer film satisfying the above requirements and improved in heat resistance and in durability.

A color filter and other necessary elements such as a protection film and/or alignment film (both not shown) are stacked on the transparent substrate 110. The color filter uses a material that transmits light of colors assigned to each pixel. These colors are, for example, either the three primary colors in additive mixing of colors such as red, green, and blue, the three primary colors in subtractive mixing of colors such as yellow, magenta, and cyan, or colors such as bluish green, yellowish green, and a color desired for the subpixel. Since the color filter lets ambient light pass through in the reflection area twice, the color filter may be changed in color density, thickness, or surface-covering area, between the reflection area RA and the transmission area TA.

The second transparent substrate 111 has a switching device 120. The switching device 120 includes a thin-film transistor having a semiconductor layer formed from polysilicon, amorphous silicon, or an organic material. Although the switching device 120 with a thin-film transistor formed from polysilicon is described by way of example below, the present invention is not limited to this example. The switching device 120 with the polysilicon thin-film transistor has a gate insulator 122, a gate electrode 123, a first interlayer insulator 124, an electrode layer 125A, an electrode layer 125B, and a second interlayer insulator 126, on the polysilicon layer including the semiconductor layer 121 which serves as a source-drain area and as a channel area.

The gate insulator 122 and the first interlayer insulator 124 are made from, for example, SiOx (silicon oxide), and the second interlayer insulator 126 is made from, for example, SiNx (silicon nitride). The electrode layers 125A and 125B need only to use a metallic electrode material, and can each be, for example, a tri-layered film with an aluminum layer sandwiched vertically between materials such as titanium (Ti) and tungsten (W). The present invention, however, is not limited to these materials. The electrode layers 125A and 125B connect to the source area and drain area, respectively, of the semiconductor layer 121 via apertures formed in the first interlayer insulator 124 and the gate insulator 122.

A foundation layer 113 that blocks entry of Na, K, and other ions from the second transparent substrate 111 into the semiconductor layer 121 and the gate insulator 122 may exist between the switching device 120 and the transparent substrate 111. The foundation layer 113 in that case will be of a stacked structure in which, when the foundation layer is viewed from a direction of the transparent substrate 111, a layer made up of SiNx and/or the like is formed first and then a layer made up of SiOx and/or the like is formed.

The switching device 120 also has an insulation layer 127 thereon. The insulation layer 127 has a function that levels out any stepped portions due to the presence of the switching device 120, electrical lines, and the like. The insulation layer 127 also has a function that bestows a concavo-convex shape upon a reflective layer or a common reflective electrode layer (both layers are described later herein).

Use of a material capable of forming a layer in a state of a solution is desirable for leveling a stepped portion. The insulation layer 127 can therefore be an organic material or an inorganic material dispersed in a solvent to allow film-coating deposition. Additionally, since the insulation layer 127 requires the step of creating a concavo-convex shape on the surface, the material, if it has photosensitivity in itself, has an advantage in that the creating step can be simplified. Furthermore, the insulation layer 127 is desirably of a transparent material whose absorbance with regard to visible light is small, so that light from a backlight can be efficiently passed through in the transmission area. An organic material such as photosensitive polyimide or acrylic resin is therefore desirable as the insulation layer 127.

The surface of the insulation layer 127 is dimpled so that the surface of the reflective layer provided in the reflection area will be formed into a concavo-convex shape. This concavo-convex shape may be achieved by forming a concavo-convex pattern with photolithography and then fusing the pattern at an elevated temperature, or may be realized using a half-tone mask during exposure. The insulation layer 127 has a planar surface in the transmission area.

On the insulation layer 127, a reflective layer 130 is formed at a section equivalent to the reflection area. The reflective layer 130 preferably uses aluminum, silver, or any other metallic material high in reflectance. The reflective layer 130 is removed from the transmission area by photolithography or the like. The surface of the reflective layer 130 assumes a concavo-convex shape that incorporates the concavo-convexity given to the surface of the insulation layer 127 existing as an underlayer of the reflective layer. Since the reflective layer 130 is of the concavo-convex shape, ambient light incident upon the liquid crystal display panel spreads at a reflecting angle of the light, at the reflective layer 130, and thus makes reflective display brighter during actual use of the display panel.

In the present embodiment, the reflective layer 130 can be connected to a common electrode line 170L to make the reflective layer 130 function as a common electrode as well. Alternatively, another electroconductive material may be stacked as a common electrode, above or below the reflective layer. In order to describe a case in which the reflective layer also functions as the common electrode, the reflective layer is hereinafter termed the common reflective electrode layer 130 also.

On the common reflective electrode layer 130 is formed an insulation layer 180, above which is further formed a common electrode 190. The insulation layer 180 is preferably of an insulating material transparent to visible light, and this material can be a polyimidic, acrylic, or any other transparent resin material, or a transparent inorganic material such as SiOx or SiNx.

In the reflection area RA, a pixel electrode 190 of a comb shape is formed via the insulation layer 180, above the common reflective electrode layer 130 that is planarly formed. In the transmission area TA, the pixel electrode 190 of a comb shape, and a common electrode 170 also of a comb shape are arranged at alternate positions on one layer.

The pixel electrode 190 and the common electrode 170 are desirably constructed of an optically transparent electroconductive material. For example, ITO (Indium-Tin Oxide) is preferred as the transparent electroconductive material, or any other optically transparent electroconductive material such as InZnO or ZnO can be used instead.

The pixel electrode 190 connects to the electrode layer 125A that forms part of the switching device 120, via an aperture (through-hole) 195 extending through the insulation layer 180, the common reflective electrode layer 130, the insulation layer 127, and the insulation layer 126. The through-hole 195 is filled with the same electroconductive material as that of the pixel electrode. Otherwise, an intermediate layer formed of an electroconductive material not shown may be provided to ensure electrical connection between the electrode layer 125A and the electrode material constituting the pixel electrode 190.

In order to prevent contact between the common reflective electrode layer 130 and the pixel electrode 190 from occurring in the through-hole 195, the common reflective electrode layer 130 has an aperture in a position equivalent to the through-hole 195, and is thus completely isolated from the pixel electrode.

In addition, the common electrode 170 electrically connects to the common electrode line 170L via a through-hole or the like. That is to say, the common electrode 170 and the common reflective electrode layer 130 are electrically connected and assume the same potential.

The electrode layer 125B connects to the data line 7, and the gate electrode 123, to the gate line 8. As shown in FIG. 2, however, part of the data line 7 may be used as the electrode layer 125B, and part of the gate line 8, as the gate electrode 123.

When necessary, a protection film (not shown) that protects the insulation layer 180 and the pixel electrode 190, and/or an alignment film (not shown) is formed on the insulation layer 180 and the pixel electrode 190.

The first transparent substrate 110 and the second transparent substrate 111 internally form a space by having respective peripheries bonded via a frame form of sealing material under a state fixedly spaced by a spacer not shown. Filling this space with an isotropic liquid crystal forms a liquid crystal layer 200. A liquid crystal material constituting the liquid crystal layer 200 will be described later herein. In two-dimensional isotropic liquid crystals of a bent-core structure, a film for vertical alignment to the substrate exists as a film for initial alignment. In three-dimensional isotropic liquid crystals, however, since the film for initial alignment is absent, there is no need to dispose the alignment film on both sides of the liquid crystal layer. If the alignment film is to be formed, a polyimidic high-polymer material or the like can be used as the alignment film.

Thickness "d" of the liquid crystal layer 200 is determined from the birefringence induced when an electric field is applied to the liquid crystal layer. In other words, if the birefringence induced in a parallel direction with respect to the substrate surface by applying a required voltage to the pixel electrode and the common electrode and forming an electric field in the liquid crystal layer is expressed as "$\Delta n$", a value of thickness "d" will be selected to obtain a retardation "$\Delta nd$" equal to $\lambda/2$ in the transmission area TA, where $\lambda$ is wavelength of the light. For example, the value of thickness "d" will be selected so that "$\Delta nd$" equals 275 nm for the light with a wavelength of 550 nm.

In actual liquid crystal display panels, however, the in-plane electric field distribution obtained will not be uniform, and the birefringence induced from the distribution will not be uniform, either. To obtain brighter display, therefore, the value of thickness "d" will be selected for the liquid crystal layer 200 to exhibit a retardation "$\Delta nd$" slightly greater than $\lambda/2$; for the light with a wavelength of 550 nm, for example, the value of thickness "d" will be selected from a data range of 275 nm $\leq \Delta nd \leq$ 400 nm.

The present embodiment assumes that the thickness "d" of the liquid crystal layer is constant between the transmission area TA and the reflection area RA. In this case, unlike a general transflective liquid crystal display panel, the stepped portion for reducing the thickness of the liquid crystal layer in the reflection area is unnecessary. This causes no ineffective area due to a stepped portion in the pixel, so a wider area in the pixel contributes to display, resulting in brighter display being obtained.

Important here is that while the thickness "d" of the liquid crystal layer is kept constant between the transmission area TA and the reflection area RA, the retardation "$\Delta nd$" at the same driving voltage in the reflection area RA can be controlled to $\lambda/4$, which is half the "$\Delta nd$" value obtained in the transmission area TA. The control can be implemented if the birefringence "$\Delta n$" induced in the liquid crystal layer at the same driving voltage, in a direction parallel to the substrate surface, is controlled so that the "$\Delta n$" value in the reflection area will be half that of the transmission area. The driving voltage here is defined as a difference between a voltage developed at the common electrode 170 and the common reflective electrode layer 130, and a voltage developed at the pixel electrode 190.

Isotropic liquid crystals cause the birefringence dependant upon the strength of the electric field applied to the liquid crystal layer, and as the strength of the field increases, the birefringence will also increase. The relationship between the field strength and the birefringence differs according to the material used. Non-Patent Document 5, for example, discloses the data indicating that the square of the field strength (E/V) and the birefringence "$\Delta n$" are proportional to each other.

Therefore, even when the thickness of the liquid crystal layer is uniform from the transmission area TA to the reflection area RA, the retardation "$\Delta nd$" in the reflection area RA can be reduced to half that of the transmission area TA by constructing the liquid crystal so that in the reflection area RA, the strength of the field formed in the liquid crystal layer will be smaller than the strength of the field formed in the liquid crystal layer at the same driving voltage in the transmission area TA.

In order to realize the above, the present embodiment is adapted so that in the reflection area RA, the pixel electrode 190 is formed into a comb shape above the common reflective electrode layer 130 via the insulation layer 180, as shown in FIG. 1, and so that in the transmission area TA, the pixel electrode 190 of a comb shape, and the common electrode 170 also of a comb shape are arranged at alternate positions on the same layer, as shown in FIGS. 1 and 2.

In this case, in the transmission area TA, an electric field including a component whose directionality to the substrate is parallel can be applied between the pixel electrode 190 and the common electrode 170. Strength of this field depends upon an inter-electrode spacing. In the reflection area RA, on the other hand, an electric field including a component whose directionality to the substrate is parallel can be formed in the liquid crystal layer, between the pixel electrode 190 and the common reflective electrode layer 130. Strength of this field depends mainly upon thickness of the insulation layer 180. This means that in the transmission area TA, the strength of the field formed in the liquid crystal layer is determined by the electrode width and electrode clearance dependant upon processing dimensional accuracy of the substrate surface having the pixel electrode and the common electrode, whereas in the reflection area RA, the strength of the field formed in the liquid crystal layer can be controlled according to the thickness of the insulation layer 180 that is independent of the processing dimensional accuracy of the substrate surface.

For example, for the liquid crystal described in Non-Patent Document 5, the strength of the field formed in the liquid crystal layer at the same driving voltage can be reduced to $1\sqrt{2}$ of the field strength in the transmission area by adjusting the thickness and dielectric constant of the insulation layer 180 as well as of the clearance between the pixel electrodes 190 in the reflection area RA.

For high-resolution liquid crystal display panels, in particular, the size of pixels decreases, so several electrodes can only be provided in one pixel of space. For a liquid crystal display panel having, for example, a screen size of 2.41 inches and a VGA (Video Graphics Array) level of resolution (640× 480 pixels), one subpixel measures 76.5 μm×25.5 μm. The number of electrodes which can be provided in one subpixel of space depends upon processing accuracy. In the above example, however, since only several electrodes can be provided for one pixel, the achievable inter-electrode clearance is limited.

For the structure in which the pixel electrode of a comb shape and the common electrode of a comb shape are arranged at alternate positions on the same layer, therefore, the relationship in the strength of the electric field in the liquid crystal layer between the transmission area and the reflection area becomes very difficult to control to a desired state.

In the present invention, however, as described above, the strength of the field formed in the section of the liquid crystal layer that is associated with the reflection area does not rely upon processing dimensional accuracy of the electrodes. In other words, since the strength of the field formed in the section of the liquid crystal layer that is associated with the reflection area can be controlled according to the thickness of the insulation layer that is independent of the processing dimensional accuracy of the substrate surface, the relationship in the electric field strength of the liquid crystal layer between the transmission area and the reflection area can be controlled to a desired state. The thickness of the insulation layer is easily changeable, so in the present invention, a transflective liquid crystal display panel using an isotropic liquid crystal can be achieved without significantly increased process loads.

A first polarizer 210 paired with a first retardation film 220, and a second polarizer 211 paired with a first retardation film 221 are disposed at opposite sides of the first transparent substrate 110 and the second transparent substrate 111, respectively, with respect to the liquid crystal layer 200. For example, a film with a polarizing function assigned by making stretched polyvinyl alcohol adsorb iodine is protected at both sides with triacetylcellulose can be used to form the first polarizer 210 and the second polarizer 211 each.

The first retardation film 220 and the second retardation film 221 both use a material that functions as a $\lambda/4$ retarder $\lambda/4$ wave plate). The first retardation film 220 is disposed so that a slow axis thereof is angled at 45 degrees to an absorption axis of the first polarizer 210. The second retardation film 221 is disposed so that a slow axis thereof is angled at 45 degrees to an absorption axis of the second polarizer 211. That is to say, the first polarizer 210 and the first retardation film 220 are stacked upon each other to form a single unit functioning as a circular polarizer. Similarly, the second polarizer 211 and the second retardation film 221 are also stacked upon each other to form a single unit functioning as a circular polarizer.

Provided that the absorption axis of the first polarizer 210 and the slow axis of the first retardation film 220 form an angle of 45 degrees, the absorption axes of the first polarizer 210 and the second polarizer 211 properly function under whatever relationship. Similarly, provided that the absorption axis of the second polarizer 211 and the slow axis of the second retardation film 221 form an angle of 45 degrees, the slow axes of the first retardation film 220 and the second retardation film 221 properly function under whatever relationship.

For a higher contrast ratio, however, it is desirable that the first polarizer 210 and the second polarizer 211 be disposed so that the respective absorption axes are perpendicular to each other, and that the first retardation film 220 and the second retardation film 221 also be disposed so that the respective slow axes are perpendicular to each other. If these retardation films are of the same material, since the retardation occurring in one retardation film and that of the other retardation film counterbalance each other at least in a frontal direction, light-blocking performance obtained by the two polarizers whose absorption axes are perpendicularly disposed can be utilized. Consequently, luminance in a dark (black) state is reduced, whereby a higher contrast ratio can be achieved.

The first retardation film 220 and the second retardation film 221 can each be a transparent high-polymer film such as a cycloolefine polymer or polycarbonate film. A stretched organic high-polymer film that contains cycloolefine minimizes coloring, since wavelength dependence of the retardation "Δnd" is relatively small. Cellulose-containing or polycarbonate-containing organic high-polymer materials with the inverse dispersion characteristics that increase the retardation "Δnd" with wavelength are available and using any of these materials allows further minimization of coloring.

The first retardation film 220 and the second retardation film 221 may be achieved in the form of a stacked assembly of a half-wave plate and a quarter-wave plate. In this case, a higher contrast ratio can likewise be realized if the half-wave plate and quarter-wave plate constituting the first retardation film 220 and the second retardation film 221 are disposed so that the slow axes of the wave plates are perpendicular to each other.

The first polarizer 210 and the first retardation film 220 are each fixed using a transparent adhesive or pressure-sensitive adhesive not shown. The first polarizer and the first retardation film have an area greater than the display area, and are fixed so as to shroud the entire display area via a transparent adhesive or pressure-sensitive adhesive not shown. Similarly, the second polarizer 211 and the second retardation film 221 are each fixed using a transparent adhesive or pressure-sensitive adhesive not shown. The second polarizer and the second retardation film have an area greater than the display area, and are fixed so as to shroud the entire display area via a transparent adhesive or pressure-sensitive adhesive not shown.

Figure 4:
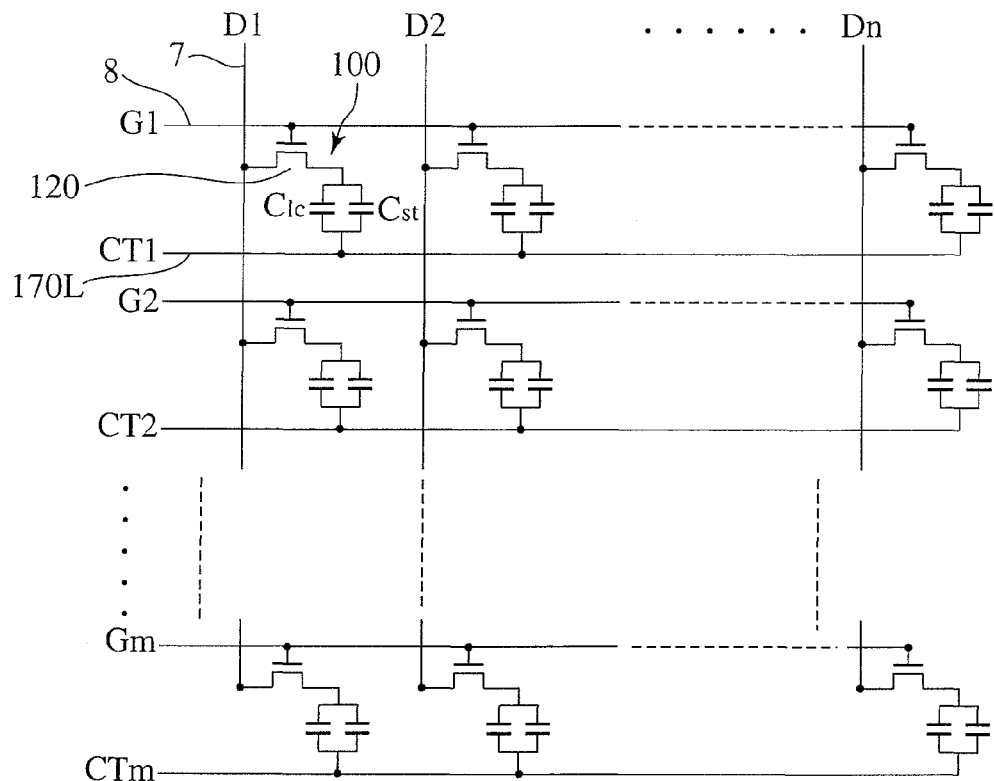
FIG. 4 is an equivalent circuit diagram of an active matrix constructed in a display area 2 of the liquid crystal display panel 1 of FIG. 3.

FIG. 4 is an equivalent circuit diagram of an active matrix constructed in the display area 2 of the liquid crystal display panel 1 of FIG. 3 that constitutes the liquid crystal display apparatus of the present invention. The liquid crystal display panel 1, as with a conventional liquid crystal display panel of an active-matrix driven type, includes a plurality of gate lines and a plurality of data lines extending in a crossing direction relative to an extending direction of the gate lines. As shown in FIG. 4, subpixels 100 are arranged in a matrix format at where an "m" number of gate lines, G1, G2, etc. up to Gm, and an "n" number of data lines, D1, D1, etc. up to Dn, intersect. In addition, common electrode lines 170L may be formed to extend at least in the same direction as that of the gate lines, and in FIG. 4, an "m" number of common electrode lines 170L are shown as CT1, CT2, etc. up to CTm. Each common electrode line 170L is connected to a common electrode and common reflective electrode layer constituting each subpixel, and is further connected to a power supply (not shown) to conduct control at a required voltage.

In the equivalent circuit diagram of FIG. 4, each subpixel can be represented as a space including three elements: (1) a storage capacitor Cst formed up of a pixel electrode, a common reflective electrode, and an insulation layer 180 interposed between these electrodes, (2) a capacitor Clc formed of a liquid crystal layer, and (3) a switching device 120.

The subpixel is driven by supplying a turn-on voltage sequentially from the gate line G1 of the first row, and within a period of one frame, supplying this voltage as a scanning signal sequentially to the gate line of the mth row. Upon the switching device 120 being turned on by the scanning signal, a voltage appropriate for an image signal is supplied from the data line 7 via the switching device 120 to the pixel electrode. This means that while the turn-on voltage to a certain gate line is on, the switching devices connected to the gate line are all turned on and a data voltage is supplied to the data line of the nth column synchronously with the turn-on event. That is to say, the liquid crystal display panel of the present invention is driven using the same method as that of the liquid crystal display panel of the conventional active-matrix driven type. Further detailed description is therefore omitted.

Figure 5:
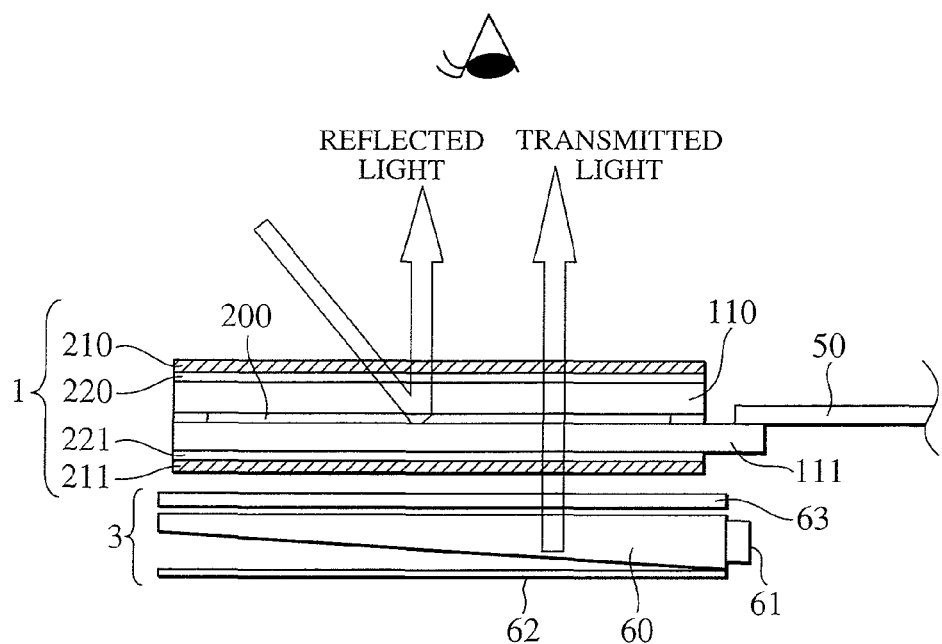
FIG. 5 is a schematic cross-sectional view showing a configuration of an essential section of a transflective liquid crystal display apparatus according to the present invention.

FIG. 5 is a schematic cross-sectional view showing a configuration of an essential section of a transflective liquid crystal display apparatus according to the present invention. This transflective liquid crystal display apparatus includes a liquid crystal display panel 1 and a backlight 3 disposed on a rear face thereof. The liquid crystal display panel 1 has the first transparent substrate 110 and the second transparent substrate 111, as described above.

In general, the second transparent substrate 111 is larger than the first transparent substrate 110, and in an area on the surface of the second transparent substrate 111 that is directed to and not shrouded by the first transparent substrate 110, has an area for receiving image signals and other image information as electrical signals from outside. That is to say, an area on the second transparent substrate 111 and in which the first transparent substrate 110 does not overlap includes a flexible printed-circuit (FPC) board 50, through which the liquid crystal display panel 1 electrically connects to outside. In addition, this area can have a semiconductor chip (not shown) that functions as a driver according to particular needs.

The backlight 3 emits light to illuminate the display area of the liquid crystal display panel 1 from a rear side thereof. The backlight 3 can be, for example, of an edge light type (light guide plate type), a direct type (reflector type), a planar light source type, or any other appropriate type. An optimal type that matches particular needs, purpose, and/or a size of the display area, is preferably selected from the above kinds and others. The description given below assumes the edge light type of backlight, but it is to be understood that the present invention is not limited thereto.

The backlight 3 includes: a light guide plate 60 formed from a transparent resin having a reverse side dot-printed with a white pigment, or having an element of a microstructured concavo-convex shape, a lens shape, or any other appropriate shape for controlling a traveling direction of light; a light source 61 disposed at an edge of the light guide plate 60; a reflecting sheet 62 disposed on the reverse side of the light guide plate 60; and optical films 63, which include a prism sheet disposed on a surface side of the light guide plate 60, a diffusing sheet, and more.

The light source 61 can be a linear light source such as a cold-cathode ray tube or hot-cathode ray tube, or a point light source such as a light-emitting diode (LED). The description given below assumes the use of an LED as the light source 61, but it is to be understood that the present invention is not limited to use of any kinds of LEDs. If an LED is used as the light source 61, providing a reflector not shown, or appropriately changing the shape of the molding resin formed around the luminous section of the LED is preferred for efficient incidence of the light from the light source upon the light guide plate 60.

In this configuration, the light exiting the light source 61 and then entering the light guide plate 60 propagates therethrough while totally reflecting. Of all light propagating through the light guide plate 60, only the light reaching the light control element provided on the reverse side of the light guide plate 60 is controlled to change the traveling direction, and exits the surface side of the light guide plate 60. The light exiting the light guide plate 60 is further controlled in exit angle distribution state and in-plane luminance distribution state by the optical films 63 such as the prism sheet and diffusing sheet, and then illuminates the liquid crystal display panel 1.

Of the light exiting the backlight 3 and illuminating the liquid crystal display panel 1, the light entering a transmission area TA has a part of the light absorbed into a second polarizer 211, then passes through a second retardation film 221, a liquid crystal layer 200, and a first retardation film 220, and enters a first polarizer 210.

At this time, when a driving voltage associated with the image information transmitted from an image information generator (not shown) is applied to the pixel electrode, a voltage difference between the pixel electrode 190 and the common electrode 170 occurs in the transmission area TA, thus forms an electric field in the liquid crystal layer 200, and induces birefringence. This action changes a polarization state of the light passing through the liquid crystal layer 200, and makes controllable the amount of light passed through the first polarizer 210.

For example, if the driving voltage is 0 V, that is, if there is no voltage difference between the pixel electrode 190 and the common electrode 170 and no electric field is formed in the liquid crystal layer 200, the polarization state of the light passing through the liquid crystal layer 200 is maintained since the liquid crystal layer 200 is optically isotropic. A large portion of the light which has passed through the liquid crystal layer 200 is therefore absorbed into the first polarizer 210 and thus the display assumes a black (dark) state.

Conversely, when a required driving voltage is applied and a required electric field is formed between the pixel electrode 190 and the common electrode 170, birefringence is induced in the liquid crystal layer 200 and as a result, the polarization state of the light passing through the liquid crystal layer 200 changes. After the light has passed therethrough, the appropriate amount of light according to the particular change in the polarization state passes through the first polarizer 210 and the display obtains required brightness. For example, under a driving voltage that causes a retardation "Δnd" of λ/2 in a parallel direction with respect to the substrate surface by means of the birefringence induced in the liquid crystal layer 200, when the light that has passed therethrough next passes through the first retardation film 220, the light is converted into light occupied primarily by a polarization component perpendicular to the absorption axis of the first polarizer 210. A large portion of the light next passes through the first polarizer 210 and maximum brightness is obtained.

Briefly, so-called the normally black type of display is achieved that assumes a black (dark) state under no driving voltage, and a bright state under the required driving voltage.

In addition, after passing through the first polarizer 210, the light entering the reflection area RA of the liquid crystal display panel 1 from outside passes through the first retardation film 220 to become essentially circularly polarized light, and furthermore, after passing through the liquid crystal layer 200, reflects from the common reflective electrode layer 130. Once again, the light that has reflected therefrom passes through the liquid crystal layer 200 and the first retardation film 221, and then enters the first polarizer 210.

At this time, as in the transmission area TA, when a voltage difference is caused between the pixel electrode 190 and the common reflective electrode layer 130 by applying the driving voltage associated with the image information transmitted from the image information generator (not shown), the electric field is formed in the liquid crystal layer 200 and birefringence is induced. This action controls the polarization state of the light passing through the liquid crystal layer 200, and when the light that has reflected from the common reflective electrode layer 130 re-enters the first polarizer 210, the amount of light passing therethrough can be controlled.

For example, if the driving voltage is 0 V, that is, if there is no voltage difference between the pixel electrode 190 and the common reflective electrode layer 130 and no electric field is formed in the liquid crystal layer 200, the liquid crystal layer 200 is optically isotropic and the polarization state of the light passing through the liquid crystal layer 200 is maintained. Because of this, light that enters the reflection area RA of the liquid crystal display panel 1 from outside passes through the first polarizer 210 and the first retardation film 220 to become essentially circularly polarized light, and after passing through the liquid crystal layer 200, the circularly polarized light reflects from the common reflective electrode layer 130. During the reflection, the traveling direction of the circularly polarized light is controlled to change a rotational direction thereof. While maintaining the polarized state, the light once again passes through the liquid crystal layer 200 and enters the first retardation film 220. The light that passes through the first retardation film 220 is acted upon thereby to be converted into light occupied primarily by a polarization component parallel to the absorption axis of the first polarizer 210. A large portion of the light is absorbed into the first polarizer 220, and thus the display assumes a black (dark) state.

Conversely, when the required driving voltage is applied and the required electric field is formed between the pixel electrode 190 and the common reflective electrode layer 130, birefringence is induced in the liquid crystal layer 200 and as a result, the polarization state of the light passing through the liquid crystal layer 200 changes. Accordingly, the ambient light entering the reflection area RA of the liquid crystal display panel 1 reflects from the common reflective electrode layer 130 and re-enters the first polarizer 210. When the light passes through the liquid crystal layer 200, however, the light changes the polarization state according to the birefringence induced in the liquid crystal layer, and the appropriate amount of light according to the change in the polarization state passes through the first polarizer 210 and the display obtains the required brightness. In the above process, the ambient light entering the reflection area RA of the liquid crystal display panel 1 passes through the liquid crystal layer 200 twice, as described above. For this reason, application of such a required driving voltage that causes a retardation "Δnd" of λ/4 in a parallel direction with respect to the substrate surface by means of the birefringence induced in the liquid crystal layer 200 results in the maximum brightness being obtained.

Briefly, so-called the normally black type of reflective display that assumes a black (dark) state under no driving voltage, and a bright state under the required driving voltage, can be achieved, as in the transmission area.

In this way, according to the present invention, a transflective liquid crystal display apparatus using an isotropic liquid crystal can be achieved. As described above, in the liquid crystal display panel of the invention, the thickness "d" of the liquid crystal layer is constant from the transmission area TA to the reflection area RA, and a stepped portion for thinning down the liquid crystal layer in the reflection area is not provided. This creates no ineffective areas due to any stepped portions occurring in the pixel, and thus yields the advantageous effects of a wider area contributing to display, and hence, brighter display being obtained.

Additionally, important here in the present invention is that the strength of the electric field formed in the liquid crystal layer at a driving voltage in the reflection area, can be reduced below the strength of the electric field formed in the liquid crystal layer at the same driving voltage in the transmission area, and thus that while the thickness "d" of the liquid crystal layer is kept constant between the transmission area and the reflection area, the retardation "Δnd" in the reflection area at the same driving voltage can be controlled to half the retardation in the transmission area.

In the present embodiment, since the strength of the field in the reflection area, in particular, can be controlled according to the thickness of the insulation layer that is independent of the processing dimensional accuracy of the substrate surface, the relationship between the field strength in the reflection area and that of the transmission area can be controlled to a desired state, even if the pixel size is small. In other words, since the thickness of the insulation layer is easily changeable, a transflective liquid crystal display panel using an isotropic liquid crystal can be achieved without significantly increased process loads.

Making a Protection Film

The above-described configuration makes achievable a transflective liquid crystal display panel using an isotropic liquid crystal. If a three-dimensional isotropic liquid crystal is used, however, since the alignment film becomes unnecessary, the pixel electrode, the common electrode, and the liquid crystal layer come into direct contact. In this configuration, if impurities in the liquid crystal are nonuniformly distributed in the electrode-liquid crystal interface by the application of a strong electric field to the liquid crystal layer, improper display could arise from a decrease in voltage hold ratio, or from flickering due to the decrease in voltage hold ratio.

In order to solve this problem, providing a protection film between the pixel electrode, the common electrode, and the liquid crystal layer, is studied in detail below.

This protection film is, for example, a 250-nm thick silicon nitride film formed by chemical vapor deposition (CVD), but may be any other inorganic or organic film. The protection film needs to have enough thickness to prevent electrical conduction with respect to the liquid crystal. The three kinds of compounds with spacer alkyl chain lengths "n" of 7, 9, and 11, shown in the structure 1 described in Non-Patent Document 2, are mixed at a ratio of 1:1.15:1, respectively, to form a composition. The liquid crystal material is the composition. The BDH1281, a chiral dopant manufactured by Merck Ltd., is mixed in a proportion of several percent for selective reflection central wavelength in a helical structure to fall in an ultraviolet wavelength region. The thus-formed material can be used to obtain an isotropic liquid crystal that exhibits optical isotropy (cholesteric blue phase) in a wide temperature range close to room temperature. Also, the liquid crystal composition is vacuum-sealed in a cell, which is then further sealed with a sealant formed from an ultraviolet-curable resin. A liquid crystal display panel is thus manufactured. It is to be understood that the liquid crystal layer at this time has a thickness of 10 microns under the sealed state of the liquid crystal, and that the liquid crystal material used at this time is not limited to any liquid crystal materials used for the studies.

Adopting the above film composition makes it possible to suppress decreases in voltage hold ratio, and prevent improper display such as flickering, in a liquid crystal display panel using an isotropic liquid crystal.

Making an Optically Isotropic Phase Stabilization Layer

Three-dimensional isotropic liquid crystals are known to have an optically isotropic three-dimensional periodic structure under no voltage. This periodic structure dimensionally varies from a type as small as the lattice constants in an ordinary crystal structure, to a type as large as the wavelength of visible light, and is a state such as that of one kind of crystal. It is likely that if a strong electric field is applied partially to the liquid crystal of such a structure, the periodic structure will be distorted, light will leak from a state such as hysteresis, and contrast will decrease. That is, upon partial application of a strong electric field to the liquid crystal layer, the electrode structure of the liquid crystal display panel may distort the periodic structure, thus preventing the liquid crystal layer from easily returning to the optically isotropic state, even after removal of the voltage. In order to solve this problem, an optically isotropic phase stabilization layer can be formed instead of the above protection film.

The isotropic phase stabilization layer here is desirably disposed so as to come into contact with a lower face of the liquid crystal layer and have a periodic structure on the surface. The distortion of the periodic structure of the isotropic liquid crystal is considered to become particularly serious in a region in close proximity to a pixel electrode or a common electrode, on the liquid crystal layer. As shown in the studies, however, if an isotropic phase stabilization layer with a periodic structure is disposed, an interaction of an interface between the isotropic phase stabilization layer and the liquid crystal layer will enhance power of the former layer to stabilize the periodic structure thereof, hence reducing alignment defects.

A more specific example of an isotropic phase stabilization layer would be such an alignment layer as used in a nematic liquid crystal, or an isotropic phase stabilization layer can be formed by oblique evaporation of $SiO_2$. More specifically, this layer can be formed by, for example, forming a polyimide film and then rubbing the surface thereof. In this case, a polyamic acid varnish solution would be formed by printing on a pixel electrode or a common electrode, and then baking the solution for 30 minutes at 220° C. to form a polyimide film of about 100 nm in thickness. After this, the surface of the polyimide film would be rubbed to provide a periodic structure thereon and thus to obtain an isotropic phase stabilization layer. A periodic structure can likewise be provided on the film by illumination with light, instead of rubbing. Unlike that of a nematic liquid crystal, the isotropic phase stabilization layer endowed with this periodic structure is not a layer intended for initial alignment in the liquid crystal layer. Therefore, there is no need to dispose the isotropic phase stabilization layer on both upper and lower interfaces of the liquid crystal layer; the isotropic phase stabilization layer needs only to be provided at a side that faces the second substrate 111.

Under the above layer composition, the isotropic phase stabilization layer contiguous to the interface of the liquid crystal layer that faces the second substrate 111 can be made to assist the isotropic liquid crystal in stabilizing the periodic structure thereof, and hence to prevent the leakage of light that will deteriorate contrast. The isotropic phase stabilization layer may be formed above the foregoing protection film formed on the pixel electrode or the common electrode.

The isotropic phase stabilization layer can likewise be formed by using polymethyl methacrylate (PMMA), a thermoplastic resin. In this case, after PMMA coating, the PMMA resin is heated to 200° C. for softening, then a mold separately created by electron beam lithography is brought into contact and pressurized to deform the PMMA film, and the deformed PMMA is cooled in that state and allowed to stand in the air until the PMMA has been cured. After this, the mold is released and a pillar 70 nm thick and 200 nm high is formed on the PMMA surface. The isotropic phase stabilization layer is thus created.

The periodic structure in the isotropic phase stabilization layer is desirably formed into a pillar or ribbed (wall-structural) shape at periods equal to or less than the wavelength of visible light (i.e., 400 nm or less) in order to prevent coloring due to interference of the light applied. The pillar or ribbed member is not limited in any aspects, only if it is a resin such as a thermoplastic resin, thermosetting resin, or photosetting resin. In addition, the periodic structure of the surface of the isotropic phase stabilization layer can be of a shape with a uni-directional train of depressions and projections, for example, a shape of a square pole, or a cylindrical shape. However, even if the pillar has either a cylindrical shape, a shape of a triangular pole, a shape of a square pole, a shape of a circular cone, a shape of a trigonal pyramid, a shape of a quadrangular pyramid, a semispherical shape, or the like, these structures need only to be formed with periodic orderliness at or below the wavelength of visible light.

Making Electrode Shapes

If the isotropic phase stabilization layer is positioned directly above the pixel electrode or the common electrode, there is a need to study countermeasures against thermal sticking coupled with rubbing or light irradiation. If a taper angle of the pixel electrode or common electrode is too large at an end portion thereof, uniform rubbing of the isotropic phase stabilization layer section close to the electrode end will be impossible, which will in turn form a defective section not assigned the periodic structure. Additionally, if the taper angle of the pixel electrode or common electrode end increases, the electric field will easily be concentrated on the corresponding region, thus making the liquid crystal layer prone to defects in optical state. These problems, however, can be solved by tapering the vicinity of the pixel electrode or common electrode end. More specifically, forming the end at a gentle tapering angle will improve the uniformity of rubbing, hence improve the concentration of the field near the end, and yield the advantageous effect of reduced partial application of the strong field to the isotropic liquid crystal. Controlling the taper angle of the end to range from a value larger than 0 degrees, to a value equal to or less than 45 degrees, is considered to enhance such an effect.

Defects due to light irradiation of the isotropic phase stabilization layer are also likely to occur. It is conceivable that emitted light will be reflected at the end of the pixel electrode or common electrode, and that the isotropic phase stabilization layer will be re-irradiated with the reflected light. If these actually occur, this means that the region exposed to the reflected light will have been doubly light-irradiated. To prevent the double irradiation, it is necessary that if the taper angle of the pixel electrode or common electrode end is expressed as θ, height of the pixel electrode and common electrode, as x, and the thickness of the isotropic phase stabilization layer, as y, data be assigned to θ, x, y so that a relationship of y>x/2 sin 2θ (45 deg<θ>90 deg) is satisfied. These data assignments are contributive to avoiding the double irradiation and realizing normal functioning of the isotropic phase stabilization layer.

Second Embodiment

A multi-domain structure of a liquid crystal display panel using an isotropic liquid crystal will be next described.

Uniaxial, optically anisotropic media has the angle dependence of retardation. For this reason, there are azimuthal angles at which, even when bright display is created in a white state in the direction normal to the liquid crystal display apparatus, an increase in retardation causes display to look yellow, or a decrease in retardation causes display to look blue. As shown in FIG. 2, therefore, if the pixel electrode or common electrode in one pixel has comb teeth oriented in one direction, slight coloring will occur according to the particular viewing direction. To improve this viewing-angle characteristic, it is effective to take measures so that when an electric field is formed in the liquid crystal layer, birefringence will be induced in a plurality of directions. When regions different in the induction direction of the birefringence are formed in one pixel, coloring in the viewing-angle direction will be averaged and suppressed. Such regions different in the induction direction of the birefringence can be formed by bending the pixel electrode and the common electrode into an acute-angle form such as <. Forming this structure will create two regions different in the direction that the electric field is formed in the liquid crystal layer when a driving voltage is applied. When the two regions different in the direction of birefringence are formed at an angle of 90 degrees relative to each other, coloring will be averaged to its maximum and the viewing-angle characteristic will correspondingly improve.

Figure 6:
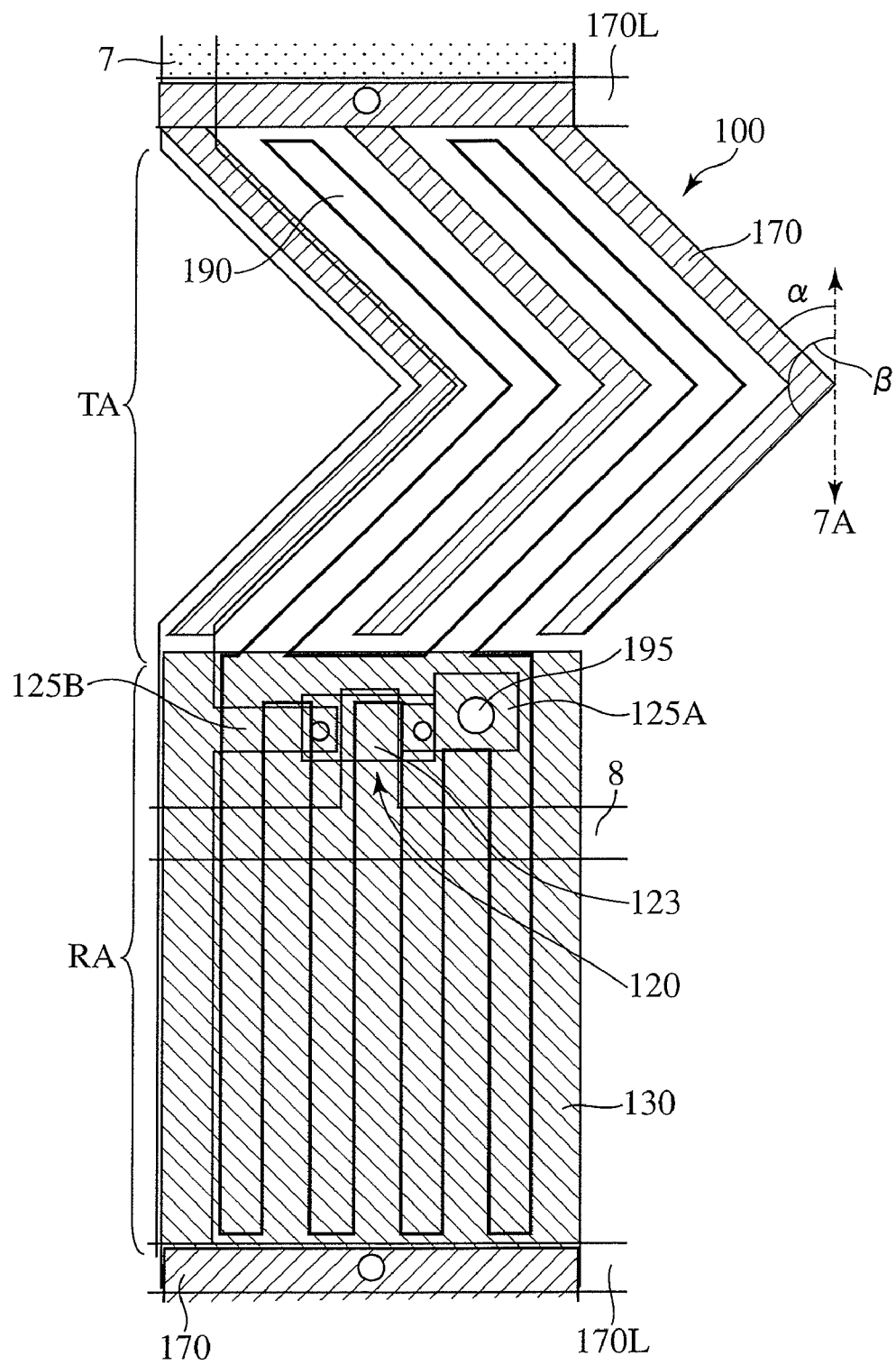
FIG. 6 illustrating another embodiment of a transflective liquid crystal display panel of the present invention is a plan view showing a schematic configuration of an essential section of a subpixel 100 in the liquid crystal display panel.

Isotropic liquid crystals, as with nematic ones, have the azimuthal angle dependence of viewing-angle characteristics. A transflective liquid crystal display panel with a multi-domain structure using an isotropic liquid crystal is described below referring to FIG. 6. FIG. 6 illustrating another embodiment of a transflective liquid crystal display panel of the present invention is a plan view showing a schematic configuration of an essential section of a subpixel 100 in the liquid crystal display panel. Elements with the same functions of the transflective liquid crystal display panel described in the foregoing embodiment are each assigned the same reference number or symbol, and repeated description of these elements is omitted.

In the present embodiment, a pixel electrode 190 and a common electrode 170 are bent into an acute-angle form such as <, in a transmission area TA. For a 90-degree bending angle of the pixel electrode 190 and the common electrode 170, inclinations of the electrodes to an extending direction (longitudinal direction) 7A of a data line are set to be α=45 degrees and β=135 degrees, respectively. At this time for an increased aperture area, the data line 7 also is desirably bent at 90 degrees, as with the pixel electrode 190 and common electrode 170 in the transmission area TA. Since the pixel electrode 190 and the common electrode 170 are bent at 90 degrees in this form, directions of the birefringence induced by an electric field formed in a liquid crystal layer of the present invention when a driving voltage is applied will form a 90-degree angle with respect to each other. Accordingly, coloring due to a difference in azimuthal angle will be averaged in one pixel and viewing-angle characteristics will improve.

Substantially the same advantageous effect can be obtained if any errors in the bending angle of the electrode stay within ±2 degrees. In addition, while a structure with the pixel electrode 190 bent only in the transmission area TA is shown in FIG. 6, the present invention is not limited to this structure and the pixel electrode 190 can have a bent shape in a reflection area RA as well.

Furthermore, particularly since the present embodiment employs a structure with a liquid crystal layer between two circular polarizers, there is an advantageous effect in that even in a multi-domain structure with bent electrodes, brightness remains invariant. That is to say, in the structure with a liquid crystal layer present between two circular polarizers that absorb linearly polarized light, when a driving voltage is applied and an electric field is formed in the liquid crystal layer, the directions of the birefringence occurring between the electrodes will be parallel or perpendicular to absorption axes of the polarizers, at the bends of the electrodes. In this case, the electrode-to-electrode region at the bends of the electrodes gives no contribution to brightness, because of no retardation being caused to the light that passes through. In the structure with a liquid crystal layer between two circular polarizers, circularly polarized light enters the liquid crystal layer. Regardless of the direction of the birefringence, therefore, a retardation is reliably caused to the light passing through the liquid crystal layer, so the electrode-to-electrode region at the bends of the electrodes can also contribute to brightness.

Third Embodiment

Figure 7:
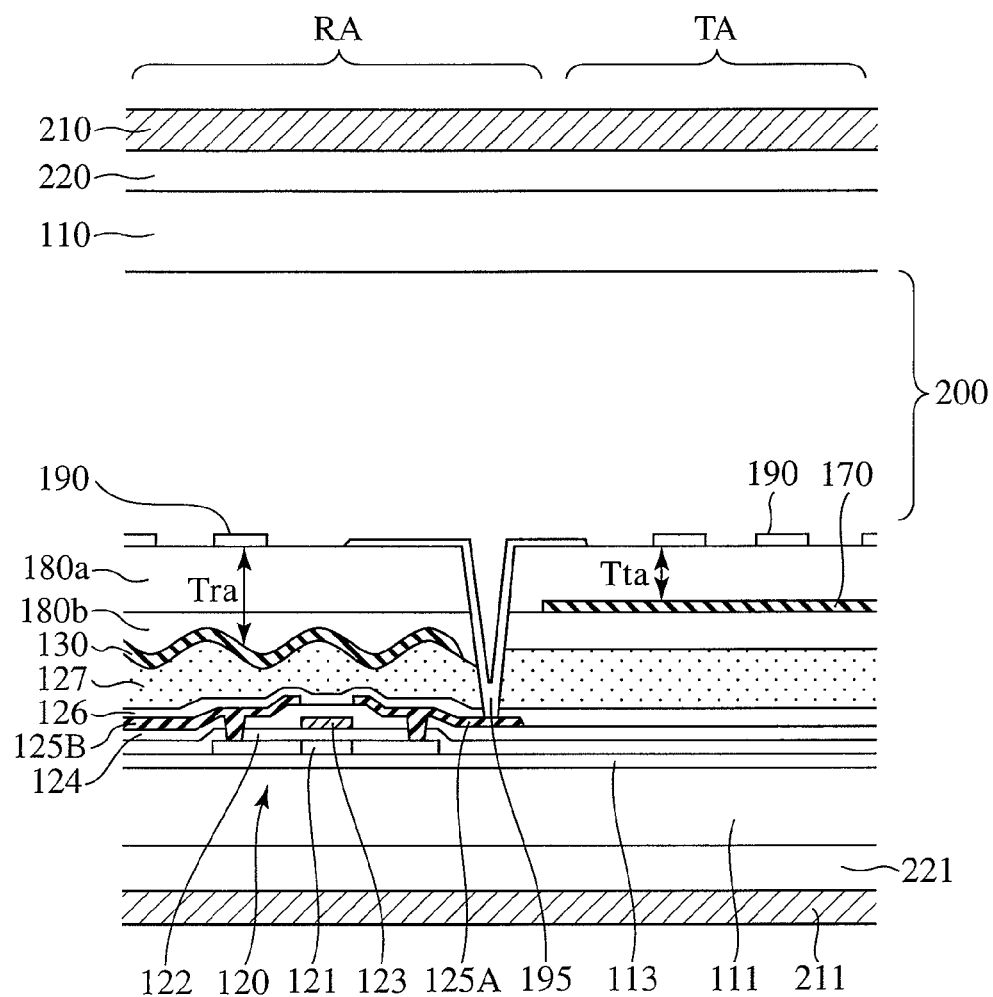
FIG. 7 is a cross-sectional view showing a schematic configuration of an essential section of a subpixel in yet another liquid crystal display panel which forms part of a transflective liquid crystal display apparatus of the present invention.

Yet another embodiment of the present invention is next described. FIG. 7 is a cross-sectional view showing a schematic configuration of an essential section of a subpixel in a liquid crystal display panel which forms part of a transflective liquid crystal display apparatus of the present invention. The liquid crystal display panel of the present invention is a modification of the display panel with the electrode structure of the transmission area TA in the foregoing embodiment described referring to FIG. 1. For this reason, elements with the same functions of the transflective liquid crystal display panel described in the foregoing embodiment are each assigned the same reference number or symbol, and repeated description of these elements is omitted.

In the present embodiment, a reflection area RA, as in the foregoing embodiment, includes a planarly formed common reflective electrode layer 130 and a comb-shaped pixel electrode 190 formed thereabove via insulation layers 180a and 180b. In the transmission area TA, the present embodiment also includes a planarly formed common electrode 170 and a comb-shaped pixel electrode 190 formed thereabove via an insulation layer 180a.

In the present embodiment, thickness "d" of a liquid crystal layer is also constant from the transmission area TA and the reflection area RA, and a stepped portion for thinning down the liquid crystal layer, in the transmission area, is absent. This creates no ineffective area due to a stepped portion, in the pixel, and presents brighter display.

Since the thickness "d" of the liquid crystal layer is kept constant from the transmission area TA and the reflection area RA, birefringence Δn occurring in the liquid crystal layer 200, at the reflection area side, needs to be reduced to half the Δn occurring at the transmission area side. In the present invention, therefore, total thickness "Tra" of the insulation layers between the pixel electrode 190 and common reflective electrode layer 130 in the reflection area RA is greater than thickness "Tta" of the insulation layer between the pixel electrode 190 and common electrode 170 in the transmission area TA.

In this case, even if the pixel electrodes 190 are of the same electrode pitch, the same kind of insulator material with a thicker insulation layer forms a weaker electric field in the liquid crystal layer. Isotropic liquid crystals cause the birefringence that depends on the strength of the field formed in the liquid crystal layer, and as the strength of the field decreases, the birefringence also decreases. The relationship between the strength of the field and the birefringence differs according to the particular liquid crystal material, so the thickness of the insulation layer requires adjustment according to properties of the liquid crystal material used.

The present embodiment has a two-layer insulator structure for easy control of the insulation layer thickness. More specifically, in the reflection area RA, insulation layers 180a and 180b are formed in a stacked condition on a common reflective electrode layer 130, and a pixel electrode 190 is formed on the stack. In the transmission area TA, a common electrode 170 is formed on an insulation layer 180b, and after an insulation layer 180a has been formed on the common electrode 170, a pixel electrode 190 is formed. In the transmission area TA, it is possible, by forming a two-layer insulator structure in this way, to control the thickness of the insulation layer between the common electrode 170 and the pixel electrode 190 to a desired value according to the particular thickness of the insulation layer 180a. In the reflection area RA, the total thickness of the insulation layers between the common reflective electrode layer 130 and the pixel electrode 190 can be controlled to a desired value by adding the thickness of the insulation layer 180b to the desired thickness of the insulation layer 180a in the transmission area TA.

In other words, the thickness of the insulation layer in the transmission area TA, and the total thickness of the insulation layers in the reflection area RA can each be independently controlled by controlling the thicknesses of the insulation layers 180a and 180b, respectively.

If the insulation layer thickness in the reflection area RA is increased above that of the transmission area TA according to the particular characteristics of the liquid crystal material, the retardation Δnd in the reflection area RA can be reduced to half that of the transmission area TA since the strength of the electric field formed in the liquid crystal layer section of the reflection area RA is reduced below the strength of the electric field formed in the liquid crystal layer section of the transmission area TA at the same driving voltage.

As set forth above, in the present embodiment, the strength of the field in the reflection area does not rely on the processing dimensional accuracy of the electrodes. This means that since the strength of the field in the reflection area is controllable according to the thickness of the insulation layer that is independent of the processing dimensional accuracy of the substrate surface, the relationship between the field strength in the reflection area and that of the transmission area can be controlled to a desired state. The insulation layer thicknesses of the transmission and reflection areas, in particular, are independently controllable by adopting the two-layer insulator structure, such that a transflective liquid crystal display panel using an isotropic liquid crystal can be realized at a wide variety of pixel sizes.

Fourth Embodiment

Figure 8:
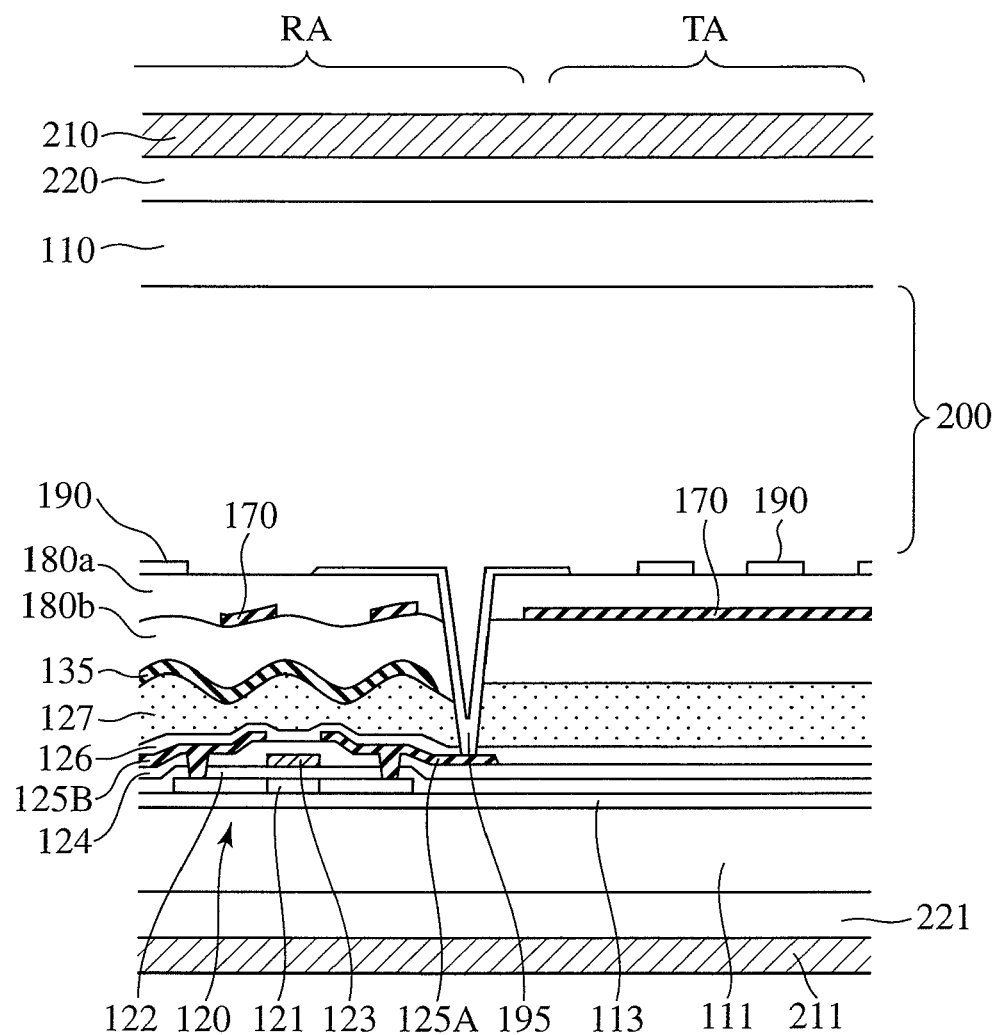
FIG. 8 is a cross-sectional view showing a schematic configuration of an essential section of a subpixel in still another liquid crystal display panel which forms part of a transflective liquid crystal display apparatus of the present invention.

Still another embodiment of the present invention is next described. FIG. 8 is a cross-sectional view showing a schematic configuration of an essential section of a subpixel in a liquid crystal display panel which forms part of a transflective liquid crystal display apparatus of the present invention. The liquid crystal display panel of the present invention is a modification of the display panel with the electrode structure of the reflection area RA in the foregoing embodiment described referring to FIG. 7. For this reason, elements with the same functions of the liquid crystal display panel described in the foregoing embodiment are each assigned the same reference number or symbol, and repeated description of these elements is omitted.

In the present embodiment, a reflective layer 135 is disposed at the location of the common reflective electrode layer 130 in the foregoing embodiment described referring to FIG. 7, and a common electrode 170 is disposed separately from the reflective layer 135. At this time, an insulation layer 180b is provided between the reflective layer 135 and the common electrode 170, and the common electrode 170 in a reflection area RA is formed with clearances, not planarly.

Figure 9:
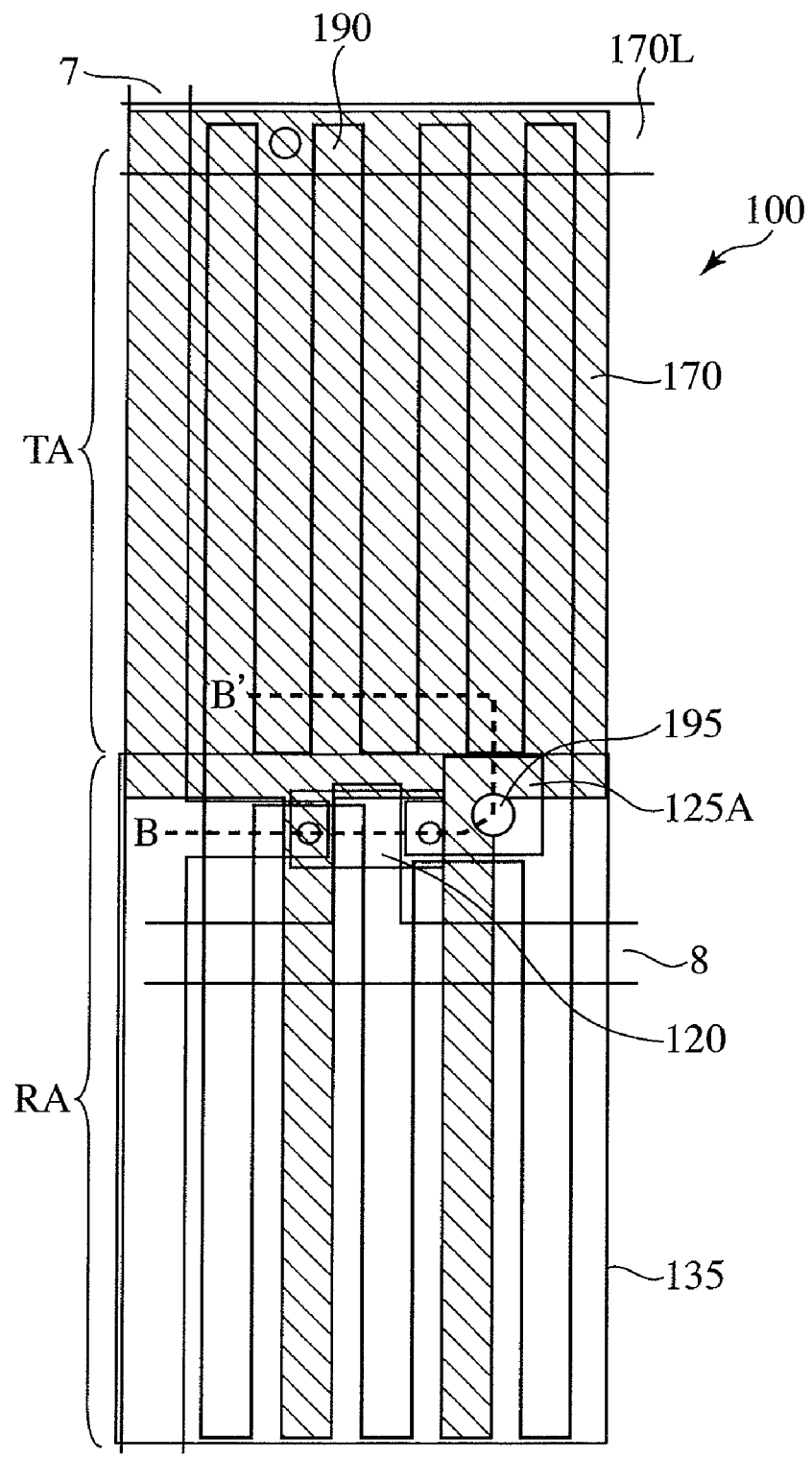
FIG. 9 is a plan view showing a schematic configuration of an essential section of a subpixel 100 in a transflective liquid crystal display panel of the present invention.
Figure 10:
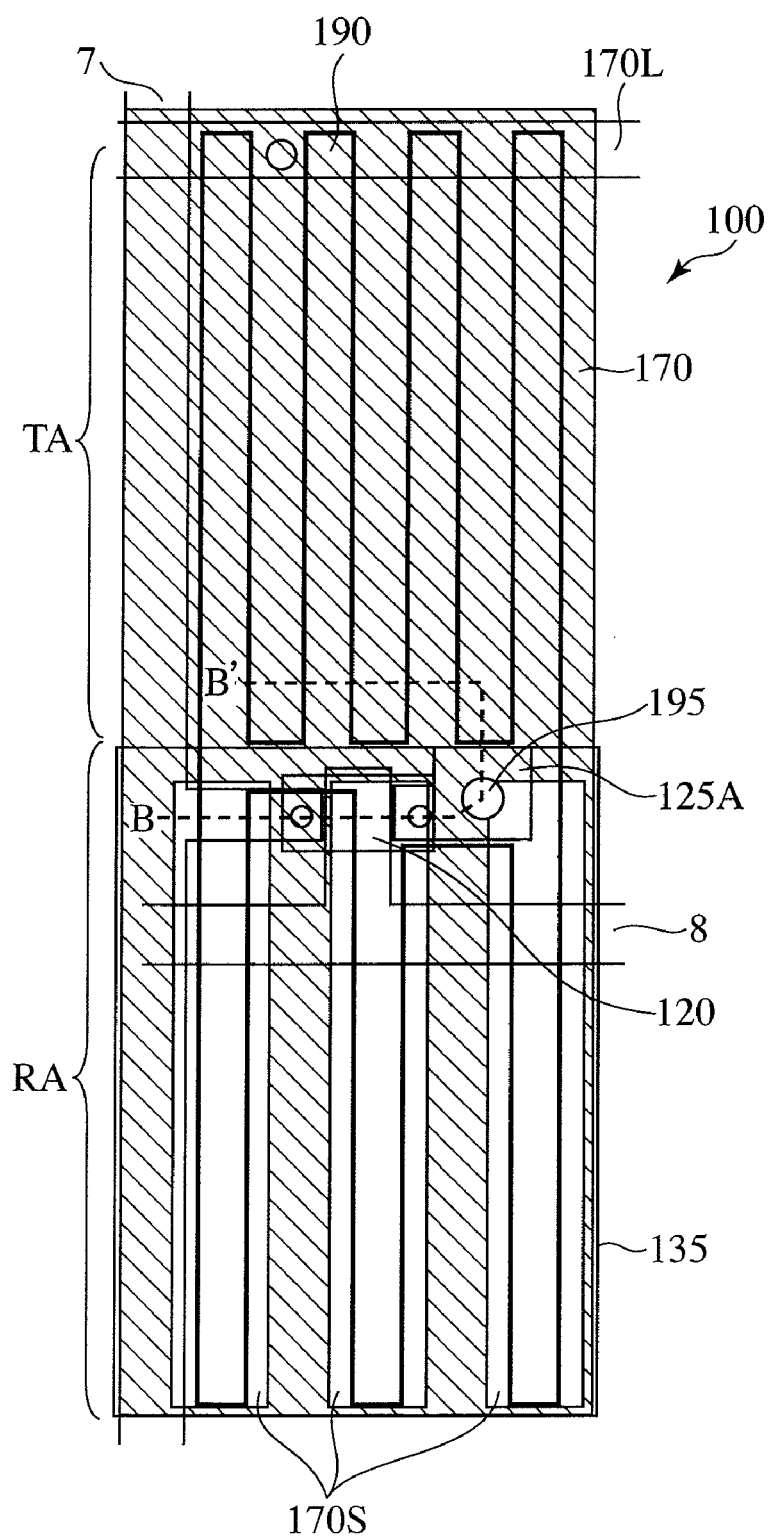
FIG. 10 is a plan view showing a schematic configuration of an essential section of a subpixel 100 in a transflective liquid crystal display panel of the present invention.

FIGS. 9 and 10 are plan views each showing a schematic configuration of an essential section of a subpixel 100 in a transflective liquid crystal display panel of the present invention. The common electrode 170 in the reflection area RA, unlike that formed planarly in a transmission area TA, is formed with clearances. These clearances may be created by, as shown in FIG. 9, forming the common electrode 170 into a comb shape in the reflection area RA, or as shown in FIG. 10, forming slit-shaped apertures (common electrode slits 170S) at the common electrode 170 formed planarly in the reflection area RA. Alternatively, apertures may be provided in an arbitrary form according to process accuracy by removing part of the planarly formed common electrode.

If a shrouding area of the common electrode 170 in the reflection area RA is suppressed in this way, the strength of an electric field formed in a liquid crystal layer section of the reflection area RA is reduced below that of the field formed in the liquid crystal layer section of the transmission area TA at the same driving voltage. The relationship between the strength of the field in the liquid crystal layer and birefringence differs according to the kind of liquid crystal material used. However, if a shrouding area of the common electrode 170 in the reflection area is controlled below the shrouding area of the common electrode 170 in the transmission area according to properties of the liquid crystal material used, the retardation Δnd induced in the liquid crystal layer section of the reflection area RA can be reduced to half that of the transmission area TA.

As set forth above, in the present embodiment, the strength of the electric field in the reflection area does not rely on the processing dimensional accuracy of the electrodes. This means that since the strength of the electric field in the reflection area is controllable according to the area of the common electrode that is independent of the processing dimensional accuracy of the substrate surface, the relationship between the field strength in the reflection area and that of the transmission area can be controlled to a desired state. Therefore, since no stepped portion is present at a boundary of the transmission area and the reflection area, bright display can be obtained and a transflective liquid crystal display panel using an isotropic liquid crystal applicable to a wide variety of pixel sizes can be realized.

Fifth Embodiment

Figure 11:
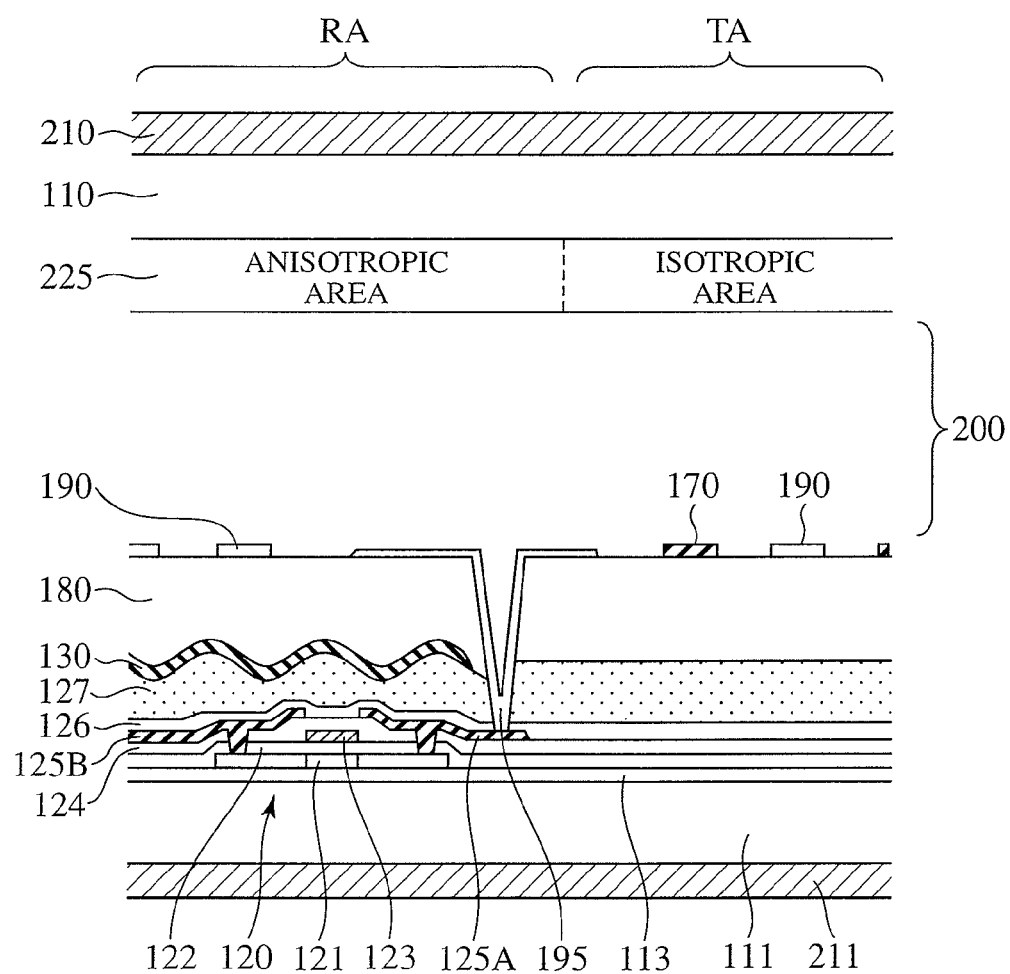
FIG. 11 is a cross-sectional view showing a schematic configuration of an essential section of a subpixel in a further liquid crystal display panel which forms part of a transflective liquid crystal display apparatus of the present invention.

A further embodiment of the present invention is next described. FIG. 11 is a cross-sectional view showing a schematic configuration of an essential section of a subpixel in a liquid crystal display panel which forms part of a transflective liquid crystal display apparatus of the present invention. In the liquid crystal display panel of the present invention, the first retardation film and the second retardation film are removed from the foregoing embodiment described referring to FIG. 1. Instead, an in-cell retardation layer 225 is provided at the liquid crystal layer 200 on the first transparent substrate 110. For this reason, elements with the same functions of the liquid crystal display panel described in the foregoing embodiment are each assigned the same reference number or symbol, and repeated description of these elements is omitted.

The in-cell retardation layer 225 is constructed to have a λ/4 retardation in the reflection area RA, and to be optically isotropic in the transmission area TA.

The in-cell retardation layer 225 can be formed using any one of the known techniques described in, for example, such documents as JP-A-2006-98623 and JP-A-2005-3382.56. In this case, after a color filter or protection film not shown, or the like has been formed on the first transparent substrate 110 according to particular requirements, an alignment process is conducted by providing an alignment film having a horizontal aligning ability, and then the alignment film surface is coated with a photoresponsive liquid crystal. After this, the photoresponsive liquid crystal material is removed from the transmission area by mask exposure, development, and/or the like, to form the birefringent in-cell retardation layer 225 in the reflection area RA. At this time, the photoresponsive liquid crystal material has its coating solution concentration and other coating parameters adjusted properly for film thickness control, whereby a layer with a retardation of λ/4 for the wavelength λ that contributes to display can be obtained. In this case, since the in-cell retardation layer 225 is removed from the transmission area, a leveling layer made from an optically transparent organic material is formed and leveling is conducted for constant thickness of the liquid crystal layer between the transmission area and the reflection area. The leveling layer is desirably constructed from an optically transparent, insulating material capable of forming a layer in a solution state and small in absorbance with respect to visible light. For example, an organic material such as a polyimidic resin or acrylic resin is desirable.

Alternatively, desired birefringence may be given only to the reflection area RA, and optical isotropy to the transmission area TA, by combining selective light irradiation and heat treatment, thereby to form the in-cell retardation layer 225. In this case, since the in-cell retardation layer 225 is essentially constant in thickness between the reflection area and the transmission area, the liquid crystal layer also becomes essentially constant in thickness between both areas.

A first polarizer 210 and a second polarizer 211 are disposed so that respective absorption axes are perpendicular to each other. Additionally, the first polarizer 210 is formed so that the absorption axis thereof is angled at 45 degrees or 135 degrees with respect to a longitudinal direction of a pixel electrode 190 formed into a comb shape.

Furthermore, the in-cell retardation layer 225 is disposed so that in the reflection area RA, an alignment direction of the liquid crystal that develops the birefringence is parallel or perpendicular to the longitudinal direction of the pixel electrode 190 formed into a comb shape. That is to say, when a driving voltage is applied, direction of the birefringence induced in the liquid crystal layer 200 is parallel or perpendicular to the alignment direction of the liquid crystal forming part of the in-cell retardation layer 225.

Of the light exiting the backlight 3 and illuminating the liquid crystal display panel 1, the light entering the transmission area TA has a part of the light absorbed into the second polarizer 211, then passes through the liquid crystal layer 200 and the in-cell retardation film 225, and enters the first polarizer 210. At this time, when a driving voltage associated with image information which is transmitted from an image information generator (not shown) is applied to the pixel electrode, a voltage difference between the pixel electrode 190 and the common electrode 170 occurs in the transmission area TA, thus forms an electric field in the liquid crystal layer 200, and induces birefringence. This action changes a polarization state of the light passing through the liquid crystal layer 200, and makes controllable the amount of light passed through the first polarizer 210.

For example, if the driving voltage is 0 V, that is, if there is no voltage difference between the pixel electrode 190 and the common electrode 170 and no electric field is formed in the liquid crystal layer 200, the polarization state of the light passing through the liquid crystal layer 200 is maintained since the liquid crystal layer 200 is optically isotropic and since the in-cell retardation layer 225 also is optically isotropic in the transmission area TA. A large portion of the light which has passed through the liquid crystal layer 200 is therefore absorbed into the first polarizer 210 and thus the display assumes a black (dark) state.

Conversely, when a required driving voltage is applied and a required electric field is formed between the pixel electrode 190 and the common electrode 170, birefringence is induced in the liquid crystal layer 200 and as a result, the polarization state of the light passing through the liquid crystal layer 200 changes. After the light has passed therethrough, the appropriate amount of light according to the particular change in the polarization state passes through the first polarizer 210 and the display obtains required brightness. For example, under a driving voltage that causes a retardation "Δnd" of λ/2 in a parallel direction with respect to the substrate surface by means of the birefringence induced in the liquid crystal layer 200, the light that has passed therethrough is converted into light occupied primarily by a polarization component perpendicular to the absorption axis of the first polarizer 210. A large portion of the light next passes through the first polarizer 220 and brightness is maximized.

Briefly, so-called the normally black type of display is achieved that assumes a black (dark) state under no driving voltage, and a bright state under the required driving voltage.

In addition, after passing through the first polarizer 210, the light entering the reflection area RA of the liquid crystal display panel 1 from outside passes through the in-cell retardation layer 225 to become essentially circularly polarized light, and furthermore, after passing through the liquid crystal layer 200, reflects from a common reflective electrode layer 130. Once again, the light that has reflected therefrom passes through the liquid crystal layer 200 and the in-cell retardation layer 225, and then enters the first polarizer 210. At this time, as in the transmission area TA, when a voltage difference is caused between the pixel electrode 190 and the common reflective electrode layer 130 by applying the driving voltage associated with the image information transmitted from the image information generator (not shown), the electric field is formed in the liquid crystal layer 200 and birefringence is induced therein. This action controls the polarization state of the light passing through the liquid crystal layer 200, and the light that has reflected from the common reflective electrode layer 130 can be used to control the amount of light passing through the first polarizer 210.

For example, if the driving voltage is 0 V, that is, if there is no voltage difference between the pixel electrode 190 and the common reflective electrode layer 130 and no electric field is formed in the liquid crystal layer 200, the liquid crystal layer 200 is optically isotropic and the polarization state of the light passing through the liquid crystal layer 200 is maintained. Because of this, light that enters the reflection area RA of the liquid crystal display panel 1 from outside passes through the first polarizer 210 and the in-cell retardation layer 225 to become essentially circularly polarized light, and after passing through the liquid crystal layer 200 with the polarized state maintained, the circularly polarized light reflects from the common reflective electrode layer 130. During the reflection, a traveling direction of the circularly polarized light is controlled to change a rotational direction thereof. While maintaining the polarized state, the light once again passes through the liquid crystal layer 200 and enters the in-cell retardation layer 225. The light that passes through the in-cell retardation layer 225 is acted upon thereby to be converted into light occupied primarily by a polarization component perpendicular to the absorption axis of the first polarizer 210. A large portion of the light is absorbed into the first polarizer 220, and thus the display assumes a black (dark) state.

Conversely, when the required driving voltage is applied and the required electric field is formed between the pixel electrode 190 and the common reflective electrode layer 130, birefringence is induced in the liquid crystal layer 200 and as a result, the polarization state of the light passing through the liquid crystal layer 200 changes. Accordingly, when the ambient light entering the reflection area RA of the liquid crystal display panel and reflecting from the common reflective electrode layer 130 passes through the liquid crystal layer 200, the polarization state of the light changes according to the birefringence induced in the liquid crystal layer 200. The appropriate amount of light according to the change in the polarization state passes through the first polarizer 210 and the display obtains the required brightness.

Consider a case in which is applied such required driving voltage that causes a retardation "$\Delta nd$" of $\lambda/4$ in a direction parallel to the substrate surface by means of the birefringence induced in the liquid crystal layer 200. In this case, if the alignment direction of the liquid crystal forming part of the in-cell retardation layer 225 is perpendicular to the direction of the birefringence induced in the liquid crystal layer 200, the retardation of $\lambda/4$ in the in-cell retardation layer 225 and the retardation of $\lambda/4$ in the liquid crystal layer 200 counterbalance each other to become substantially zero. Therefore, the light entering from outside has a part of the light absorbed into the first polarizer 210, then reflects from the common reflective electrode 130, and re-enters the first polarizer while essentially maintaining the polarized state. For this reason, a large portion of the light passes through the first polarizer 210 and thus brightness is maximized.

Conversely, if the alignment direction of the liquid crystal forming part of the in-cell retardation layer 225 is parallel to the direction of the birefringence induced in the liquid crystal layer 200, the retardation of $\lambda/d$ in the in-cell retardation layer 225 and the retardation of $\lambda/4$ in the liquid crystal layer 200 are added to become $\lambda/2$. Therefore, the light entering from outside has a part of the light absorbed into the first polarizer 210, then reflects from the common reflective electrode 130, and re-enters the first polarizer. The retardation of the light passing through the in-cell retardation layer 225 and the liquid crystal layer 200 twice, at that time, however, becomes $\lambda$ and is converted into light occupied primarily by a polarization component perpendicular to the absorption axis of the first polarizer. A large portion of the light passes through the first polarizer 220 and brightness is maximized.

Briefly, so-called the normally black type of reflective display that assumes a black (dark) state under no driving voltage, and a bright state under the required driving voltage, can be achieved.

In this fashion, bright display is possible, irrespective of whether the alignment direction of the liquid crystal forming part of the in-cell retardation layer 225 is parallel or perpendicular to the direction of the birefringence induced in the liquid crystal layer 200. For reduced coloring in the white state, however, the retardation levels in the in-cell retardation layer 225 and the liquid crystal layer 200 are preferably reduced and hence the alignment direction of the liquid crystal forming part of the in-cell retardation layer 225 is desirably made perpendicular to the direction of the birefringence induced in the liquid crystal layer 200.

As described above, in the liquid crystal display panel of the present invention, the thickness "d" of the liquid crystal layer from the transmission area TA to the reflection area RA is kept constant and no stepped portion is provided. This creates no ineffective areas due to any stepped portions occurring in the pixel, and thus yields the advantageous effects of a wider area contributing to display, and hence, brighter display being obtained.

Additionally, in the present embodiment, since the strength of the electric field in the reflection area can also be controlled according to the thickness of the insulation layer that is independent of the processing dimensional accuracy of the substrate surface, the relationship between the field strength in the reflection area and that of the transmission area can be controlled to a desired state, even if the pixel size is small. In other words, since the thickness of the insulation layer is easily changeable, a transflective liquid crystal display panel using an isotropic liquid crystal corresponding to the wider range of pixel size can be achieved without significantly increased process loads.

In the present embodiment, the advantage below is yielded particularly since the in-cell retardation layer 225 is provided internally to an optically transparent substrate. That is to say, since the in-cell retardation layer 225 is constructed from a liquid crystal high polymer, the birefringence $\Delta n$ is much greater than that of a retardation layer created from a stretched organic high-polymer film. When the same retardation is to be achieved, therefore, the thickness of the in-cell retardation layer 225 is controlled to less than 1/10 of that of a retardation layer constructed from a stretched organic high-polymer film. In addition, although the foregoing embodiment has needed two retardation films, if an optically anisotropic in-cell retardation layer 225 is provided in the reflection area only, one retardation layer just suffices. This yields an effect in that the liquid crystal display panel can be thinned down relative to a type that uses retardation films.

Sixth Embodiment

Figure 12:
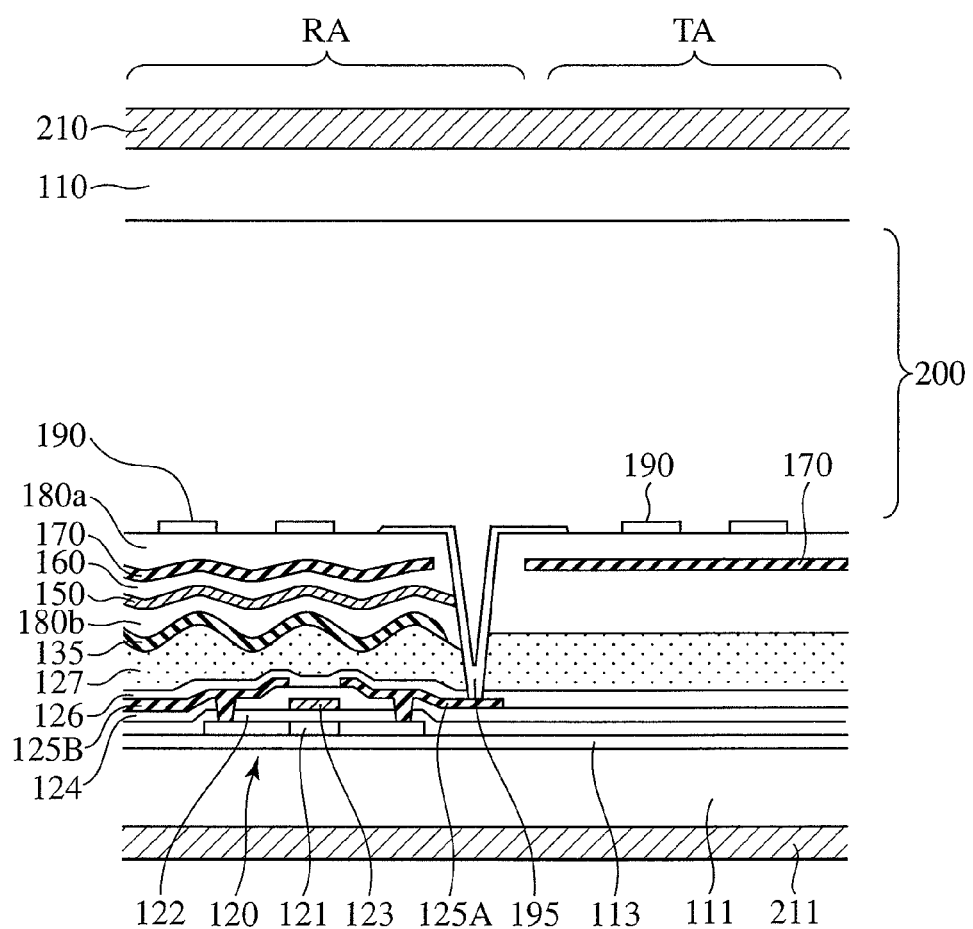
FIG. 12 is a cross-sectional view showing a schematic configuration of an essential section of a subpixel in a further liquid crystal display panel which forms part of a transflective liquid crystal display apparatus of the present invention.
Figure 13:
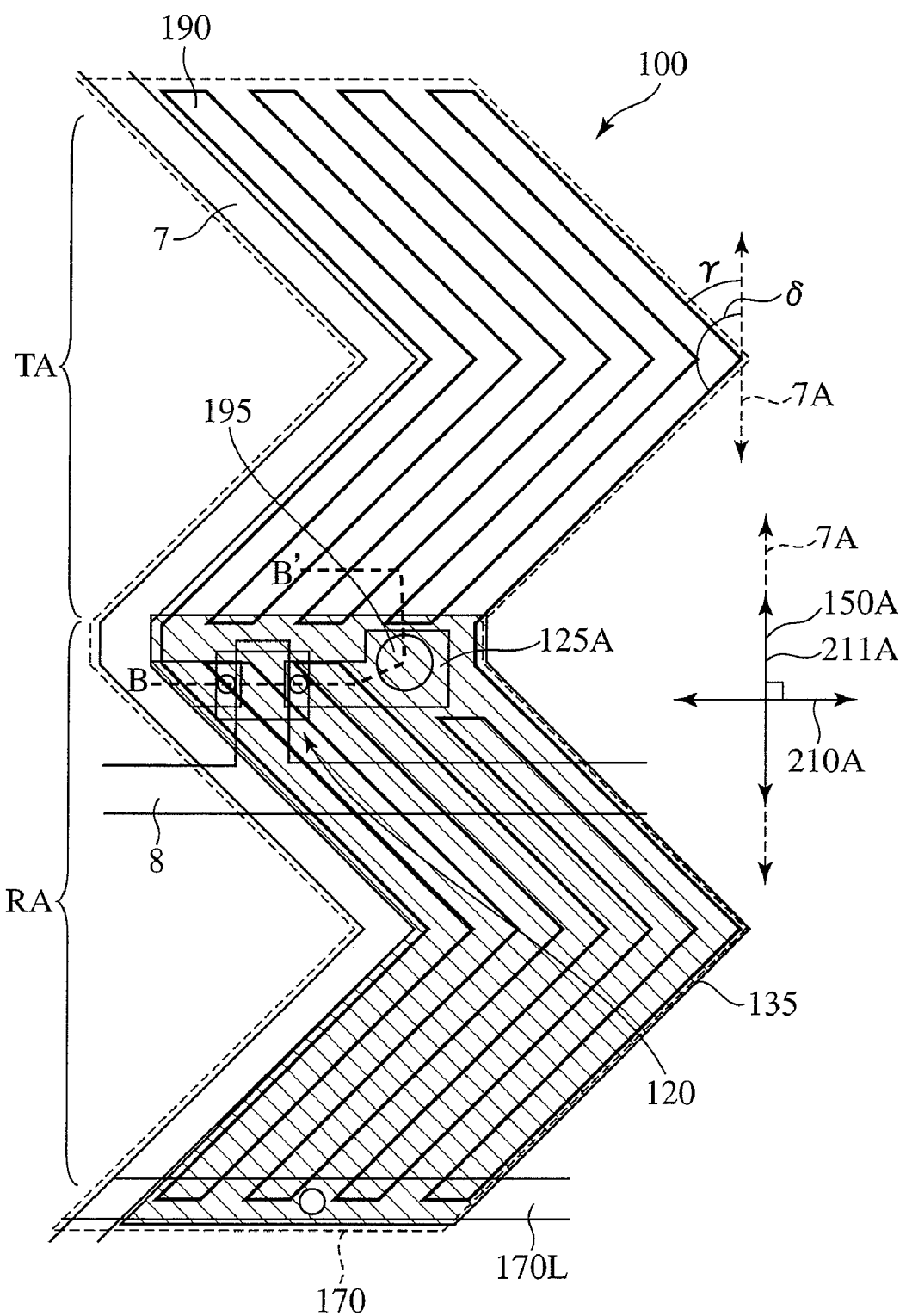
FIG. 13 is a plan view showing the schematic configuration of the essential section of the subpixel 100 in the liquid crystal display panel of FIG. 12.

A further embodiment of the present invention is next described. FIG. 12 is a cross-sectional view showing a schematic configuration of an essential section of a subpixel in a liquid crystal display panel which forms part of a transflective liquid crystal display apparatus of the present invention. FIG. 13 is a plan view showing the schematic configuration of the essential section of the subpixel 100 in the liquid crystal display panel of FIG. 12. FIG. 12 schematic represents a cross-sectional structure of section B-B' of FIG. 13.

In the present invention, the first retardation film and second retardation film in the foregoing embodiment described referring to FIG. 8 are removed and the structure of the reflection area RA in FIG. 8 is modified. For this reason, elements with the same functions of the liquid crystal display panel described in the foregoing embodiment are each assigned the same reference number or symbol, and repeated description of these elements is omitted.

In the present embodiment, a reflection area RA including a planarly formed common electrode 170 further includes a polarizing layer 150 and a protection layer 160, between the common electrode 170 and an insulation layer 180b. Also, pixel electrodes 190 are formed to be the same in width and pitch between the reflection area RA and the transmission area TA. Since the structure from the common electrode 170 up is basically the same between the reflection area RA and the transmission area TA, therefore, the birefringence induced in the liquid crystal layer 200 when a driving voltage is applied will take the same value between the reflection area RA and the transmission area TA.

The polarizing layer 150 is formed above a reflective layer 135 via the insulation layer 180b. At this time, since the reflective layer 135 has a concavo-convex surface shape, the insulation layer 180b desirably has a function that levels out the surface shape of the reflective layer 135 in order to facilitate the formation of the polarizing layer 150. Accordingly, the insulation layer 180b is desirably constructed from an optically transparent material capable of forming a layer in a solution state and small in absorbance with respect to visible light. For example, an organic material such as a polyimidic resin or acrylic resin is desirable.

The polarizing layer 150 absorbs linearly polarized light having a plane of vibration in a required axial direction, and transmits linearly polarized light having a plane of vibration in a direction perpendicular to that axial direction. The polarizing layer 150 can be formed by coating with any one of the lyotropic liquid crystal dyes described in, for example, "Y. Ukai et al., "Current Status and Future Prospect of In-Cell Polarizer Technology", SID 04 DIGEST, pp. 1170-1173, 2004" (listed as Non-Patent Document 6 herein), or "Ir Gvon Khan et al., "Ultra-Thin O-Polarizers' Superiority over E-Polarizers for LCDs", SID 04 DIGEST, pp. 1316-1319, 2004" (listed as Non-Patent Document 7 herein).

For example, if the material described in above Non-Patent Document 6 is used, the polarizing layer 150 is desirably formed by coating with a slit-die coater, for example. The slit-die coater can supply a polarizing layer material under a solution state thereof to a surface to be coated, and at the same time, stretch the material in a coating direction while applying pressure to the material. In this process, the dye is aligned and immobilized, whereby the polarizing layer can be formed. In this case, the polarizing layer has its absorption axis oriented perpendicularly to the coating direction. A material that will exhibit polarizing properties when irradiated with linearly polarized light may be used to form the polarizing layer.

The polarizing layer 150 is desirably not formed in the transmission area for the reasons described later herein. In the present embodiment, therefore, an example in which the polarizing layer 150 is not formed in the transmission area is described below. When necessary, a protection layer 160 may be provided above the polarizing layer 150. In steps that follow formation, polarizing layer materials are liable to deteriorate themselves or to deteriorate other structures if internal impurities ooze from the material. Therefore, the protection layer 160 is preferably provided to suppress or prevent such deterioration. The protection layer 160 is preferably a material transparent to visible light, and this material can be an optically transparent resin material such as a polyimidic or acrylic resin, or an optically transparent inorganic material such as SiOx or SiNx. For higher protection layer performance, SiNx, in particular, is desirable since this material allows a finer layer to be formed.

FIG. 13 also represents a relationship between an absorption axis 210A of a first polarizer 210 for linear polarization, an absorption axis 211A of a second polarizer 211 for linearly polarization, the absorption axis 150A of the polarizing layer 150 for linearly polarization, and an extending direction (longitudinal direction) 7A of data lines.

In the present embodiment, the first polarizer and the second polarizer are disposed so that the respective absorption axes 210A and 211A are perpendicular to each other and so that the absorption axis 210A of the first polarizer is also perpendicular to the extending direction 7A of each data line. Additionally, the polarizing layer 150 is disposed so that the absorption axis 150A thereof is parallel to the absorption axis 211A of the second polarizer.

Furthermore, each pixel electrode 190 is bent into an acute-angle form such as <. Angles γ and δ that the pixel electrode 190 forms with respect to the extending direction 7A of the data line by the particular bend are 45 degrees and 135 degrees, respectively, and a bending angle of the pixel electrode is 90 degrees. In this case, the data line 7, as with the pixel electrode 190, is desirably bent at 90 degrees for a reduced ineffective area and an increased aperture area, as shown. Such 90-degree bending of the pixel electrode 190 makes it possible to create two regions in which the direction of the birefringence induced by the formation of an electric field in the liquid crystal layer. Since the two regions form an angle of 90 degrees with respect to each other in one pixel, coloring due to differences in viewing direction is averaged and viewing-angle characteristics improve. That is to say, the liquid crystal display panel can provide wider viewing angles. Substantially the same advantageous effect is obtainable if any errors in the bending angle of the electrode stay within a range of ±2 degrees.

Moreover, bending the pixel electrode yields yet another advantageous effect. That is to say, in the present embodiment, since the pixel electrode 190 has the bent structure described above, the absorption axis 150A of the polarizing layer 150 can face in a direction parallel to the extending direction 7A of the data line 7. For example, if substantially the same material as that described in Non-Patent Document 6 is used as the polarizing layer 150, therefore, the coating direction of the material can be made perpendicular to the extending direction of the data line.

The second transparent substrate 111 for forming part of the liquid crystal display panel usually has a rectangular shape with a side parallel to the extending direction of the data line 7 and that of gate lines 8. Therefore, for example, to incline the absorption axis of the polarizing layer 150 to the extending direction of the data line, it becomes necessary that for example, when the material used to form the polarizing layer is substantially the same material as that described in Non-Patent Document 6 or when the polarizing layer material to be used causes the absorption axis to be formed in a perpendicular direction with respect to the coating direction similarly to the above material, the particular coating direction should be oblique to the side of the second transparent substrate 111. In this case, since corners of the transparent substrate cannot be coated with the material by using a general slit-die coater, an ineffective area that does not permit coating will occur on the substrate.

In contrast to this, in the present embodiment, the absorption axis 150A of the polarizing layer is parallel to the extending direction 7A of the data line 7. Therefore, when the material used to form the polarizing layer 150 is substantially the same material as that described in Non-Patent Document 6 or when the polarizing layer material to be used causes the absorption axis to be formed in a perpendicular direction with respect to the coating direction similarly to the above material, the particular coating direction will be parallel to the side of the second transparent substrate 111. Consequently, an ineffective area that does not permit coating on the substrate will decrease and productivity will improve.

In addition, the second transparent substrate 111 forming part of the liquid crystal display panel is commonly acquired by cutting one larger mother substrate into a plurality of pieces after conducting various process steps upon the mother substrate. Since the mother substrate is of a rectangular shape, if as in the present embodiment, the coating direction of the polarizing layer material is parallel to the side of the second transparent substrate 111, an ineffective area that does not permit coating with the polarizing layer material also decreases on the substrate and thus the second transparent substrate can be acquired efficiently. In short, the number of second transparent substrates acquirable from one mother substrate increases and productivity improves for reduced costs.

Of the light illuminating the liquid crystal display panel from the backlight, the light entering the transmission area TA passes through the second polarizer 211, then passes through the liquid crystal layer 200, and enters the first polarizer 210. At this time, when a driving voltage associated with image information which is transmitted from an image information generator (not shown) is applied, a voltage difference between the pixel electrode and the common electrode occurs, thus forms an electric field in the liquid crystal layer, and induces birefringence. This action controls a polarization state of the light passing through the liquid crystal layer 200, and makes controllable the amount of light passing through the first polarizer 210.

For example, if the driving voltage is 0 V, that is, if there is no voltage difference between the pixel electrode and the common electrode and no electric field is formed, the polarization state of the light passing through the liquid crystal layer 200 is maintained since the liquid crystal layer 200 is optically isotropic. The light passing through the liquid crystal layer 200 is therefore absorbed into the first polarizer 210 and thus the display assumes a black (dark) state.

Conversely, when a required driving voltage is applied and a required electric field is formed between the pixel electrode and the common electrode, birefringence is induced in the liquid crystal layer 200 according to particular strength of the field, and as a result, the polarization state of the light passing through the liquid crystal layer 200 changes. When the birefringence causes an effective retardation of $\lambda/2$ to the light passing through the liquid crystal layer 200, a large portion of the light next passes through the first polarizer 210 and brightness is maximized. Briefly, so-called the normally black type of display is achieved that assumes a black (dark) state under no driving voltage, and a bright state under the required driving voltage.

In addition, after passing through the first polarizer 210, the light entering the reflection area RA of the liquid crystal display panel from outside passes through the liquid crystal layer 200 and enters the polarizing layer 150. At this time, as in the transmission area TA, when a voltage difference is caused between the pixel electrode and the common electrode by the application of a driving voltage associated with the image information transmitted from the image information generator (not shown), an electric field is formed in the liquid crystal layer 200 and birefringence is induced therein. This action controls the polarization state of the light passing through the liquid crystal layer 200, and hence controls the amount of light passing through the polarizing layer 150.

For example, if the driving voltage is 0 V, that is, if there is no voltage difference between the pixel electrode and the common electrode and no electric field is formed, the polarization state of the light passing through the liquid crystal layer 200 is maintained since the liquid crystal layer 200 is optically isotropic. Because of this, a large portion of the light passing through the liquid crystal layer 200 is absorbed into the polarizing layer 150. At this time, slight light passing through the polarizing layer 150 reflects from the reflective layer 135, then passes through the polarizing layer 150 and the liquid crystal layer 200, and enters the first polarizer 210. A large portion of this light is absorbed into the first polarizer 210, and thus the display assumes a black (dark) state.

Conversely, when the required driving voltage is applied and the required electric field is formed between the pixel electrode and the common electrode, birefringence is induced in the liquid crystal layer 200 according to the particular strength of the field, and as a result, the polarization state of the light passing through the liquid crystal layer 200 changes. Accordingly, when the light passes through the liquid crystal layer 200, the appropriate amount of light according to the change in the polarization state passes through the polarizing layer 150 and enters the reflective layer 135. The light entering the reflective layer 135 is reflected thereby and re-enters the polarizing layer 150, but during the reflection by the reflective layer 135, the polarization state of the light is essentially maintained. Because of this, a large portion of the light re-entering the polarizing layer 150 passes therethrough, and after passing through the liquid crystal layer 200, enters the first polarizer 210. The polarization state of the light passing through the liquid crystal layer 200 at this time changes according to the birefringence induced therein. During the passage of the light through the liquid crystal layer 200, therefore, the appropriate amount of light according to the change in the polarization state passes through the first polarizer 210, and the display obtains the required brightness. At this time, maximum brightness is obtained when an effective retardation of $\lambda/2$ of the light passing through the liquid crystal layer is caused by the birefringence induced therein. Briefly, so-called the normally black type of display is achieved that assumes a black (dark) state under no driving voltage, and a bright state under the required driving voltage.

In the present embodiment, since, as described above, the structure from the common electrode 170 up is basically the same between the reflection area RA and the transmission area TA, the birefringence induced in the liquid crystal layer 200 when a driving voltage is applied will take the same value between the reflection area RA and the transmission area TA. However, since the polarizing layer 150 is interposed therebetween, the transflective liquid crystal display panel in which the reflection area RA and the transmission area TA both assume the normally black state can be achieved.

In particular, the present embodiment includes a polarizing layer disposed between a pixel electrode and a common electrode. In this configuration, compared with a structure including a pixel electrode and common electrode shrouded with a polarizing layer, the driving voltage to be applied can be lowered and high reflectance can be obtained. This makes avoidable any adverse effects of the above layer layout upon the driving voltage and upon reflectance. This, in turn, yields the advantageous effects of reflectance being improved, a contrast ratio being correspondingly improved, and power consumption being reduced by reductions in the driving voltage, or costs being reduced by use of a general-purpose driver lower in withstand voltage.

In addition, in the transmission area TA, since no polarizing layer exists, high transmittance is obtainable, compared with a case in which a polarizing layer exists. In other words, the advantageous effect of improved transmittance over the case in which a polarizing layer exists in the transmission area TA is obtainable and there is another effect in that during image display with the same brightness, backlight power consumption can be reduced according to the particular improvement rate of transmittance.

The material used in the polarizing layer may adversely affect the liquid crystal layer if the polarizing layer is provided in the reflection area RA. In the transflective liquid crystal display panel of the present invention, no polarizing layer is formed in the transmission area TA. For this reason, even if a polarizing layer is likely to deteriorate the liquid crystal layer, a usage quantity of the polarizing layer material can be minimized. Additionally, between the liquid crystal layer and the polarizing layer, the protection layer 160, the common electrode 170, and the insulation layer 180*a* are stacked, which makes the liquid crystal layer 200 easy to protect. For example, if a fine film made from SiNx or the like is formed as the protection layer 160 or the insulation layer 180*a*, deterioration of the liquid crystal layer due to the presence of the polarizing layer can be suppressed very effectively.

As described above, in the liquid crystal display panel of the present invention, the thickness "d" of the liquid crystal layer is kept constant between the transmission area TA and the reflection area RA, and no stepped portion is provided, which creates no ineffective area due to any stepped portions occurring in the pixel. This yields the advantageous effects of a wider area contributing to display, and hence, brighter display being obtained.

In addition, in the present embodiment, a transflective liquid crystal display panel using an isotropic liquid crystal can be achieved without changing the strength of the electric field between the transmission area and the reflection area. Furthermore, since no retardation film is required, there is an effect in that the liquid crystal display panel can be thinned down relative to a type that uses retardation films.

Seventh Embodiment

Figure 14:
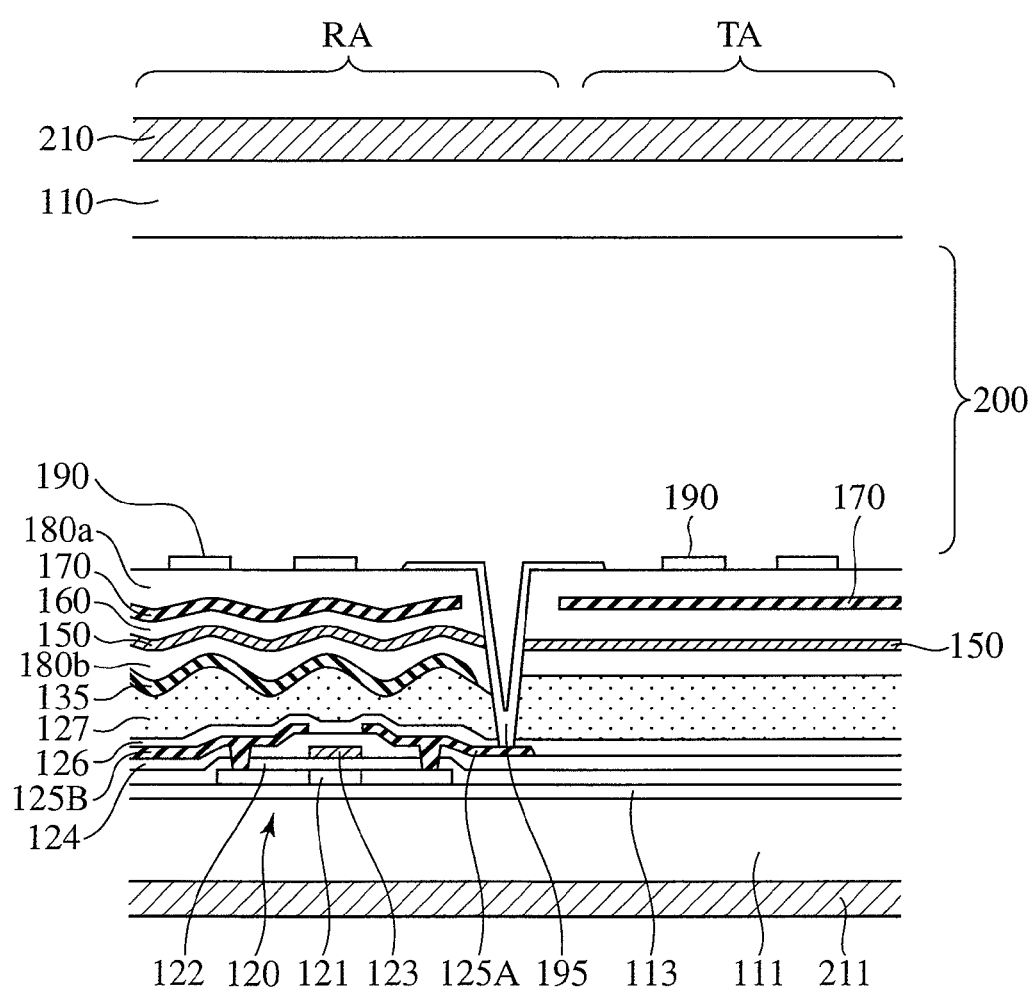
FIG. 14 is a cross-sectional view showing a schematic configuration of an essential section of a subpixel in a further liquid crystal display panel which forms part of a transflective liquid crystal display apparatus of the present invention.

A further embodiment of the present invention is next described. FIG. 14 is a cross-sectional view showing a schematic configuration of an essential section of a subpixel in a liquid crystal display panel which forms part of a transflective liquid crystal display apparatus of the present invention. Except that a polarizing layer 150 is provided in the transmission area TA as well, the present embodiment is substantially the same as the liquid crystal display panel described referring to FIG. 12. For this reason, elements with the same functions of the liquid crystal display panel described in the foregoing embodiment are each assigned the same reference number or symbol, and repeated description of these elements is omitted.

That is to say, the present embodiment includes a polarizing layer 150 between a pixel electrode 190, a common electrode 170, and a second transparent substrate 111, in the transmission area TA. The polarizing layer 150 can be of the same material as that of a polarizing layer formed in the reflection area, and an absorption axis of the polarizing layer 150 is matched to that of the second polarizer 211, as in the reflection area.

In the present embodiment, although the polarizing layer 150 is provided in the transmission area TA, no polarizing layer is provided between the pixel electrode, the common electrode, and the liquid crystal layer. Adversely affects of the polarizing layer 150 upon liquid crystal driving can therefore be avoided. For this reason, for example, if there is a polarizing layer that shrouds the pixel electrode and the common electrode, that is, in comparison with disposing a polarizing layer between the liquid crystal layer, the pixel electrode, and the common electrode, high transmittance can be obtained at a lower driving voltage.

In the present embodiment, providing the polarizing layer 150 in the transmission area TA slightly reduces transmittance. However, since a rate of the reduction in transmittance during a black (dark) state due to the provision of the polarizing layer increases above a reduction rate of the transmittance obtained during a white (bright) state, there is an advantageous effect in that transflective display improves in contrast ratio. For example, when a polarizing layer with a dichroic ratio of about 25 is formed with a thickness of 300 nm, the contrast ratio improves by about 1.9 times that achieved without a polarizing layer.

Eighth Embodiment

Figure 15:
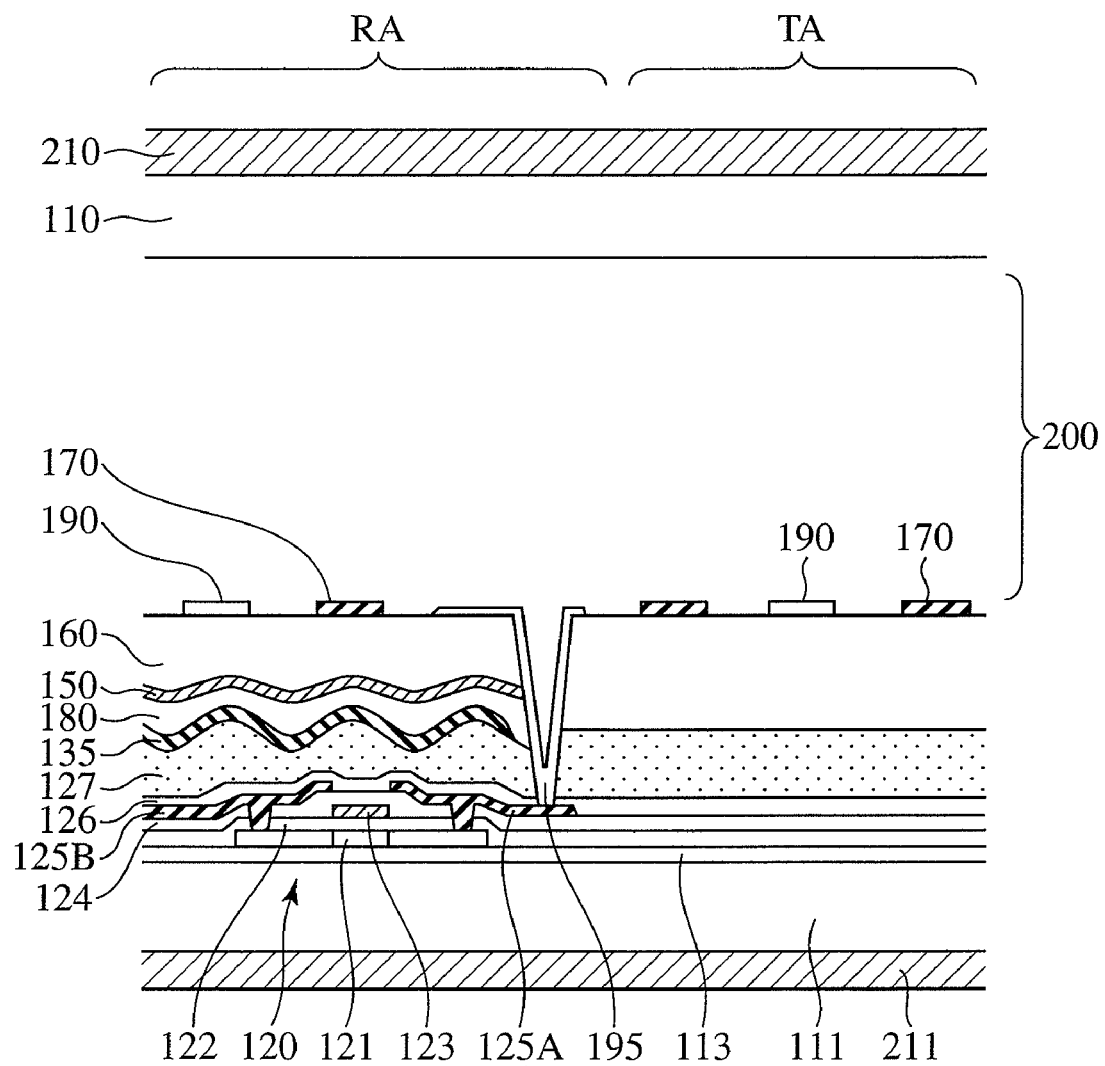
FIG. 15 is a cross-sectional view showing a schematic configuration of an essential section of a subpixel in a further liquid crystal display panel which forms part of a transflective liquid crystal display apparatus of the present invention.

A further embodiment of the present invention is next described. FIG. 15 is a cross-sectional view showing a schematic configuration of an essential section of a subpixel in a liquid crystal display panel which forms part of a transflective liquid crystal display apparatus of the present invention. Elements with the same functions of the liquid crystal display panel described in the foregoing embodiment are each assigned the same reference number or symbol, and repeated description of these elements is omitted.

In the present embodiment, as shown, a common electrode 170 and a pixel electrode 190 are formed on one layer in both a transmission area and a reflection area. Additionally, the common electrode and the pixel electrode are both of a comb shape and are disposed at alternate positions. At this time, the common electrode and the pixel electrode are of the same width and same pitch between the transmission area and the reflection area. A liquid crystal layer 200 is also of the same thickness.

In the present embodiment, as in the foregoing embodiment, the polarizing layer 150 is disposed between the pixel electrode 190, the common electrode 170, and a reflective layer 135, in the reflection area RA, so in comparison with a structure including a pixel electrode and common electrode shrouded with a polarizing layer, a driving voltage to be applied can be lowered and high reflectance can be obtained. This, in turn, yields the advantageous effects of reflectance being improved, a contrast ratio being correspondingly improved, and power consumption being reduced by reductions in the driving voltage, or costs being reduced by use of a general-purpose driver lower in withstand voltage.

In addition, in the transmission area TA, since no polarizing layer exists, high transmittance is obtainable at a lower driving voltage, compared with the structure including a pixel electrode and common electrode shrouded with a polarizing layer, that is, the structure in which a polarizing layer exists between a liquid crystal layer and a pixel electrode and a common electrode. In other words, the advantageous effects of improved transmittance and hence, improved contrast ratio, are obtainable and there is a further effect in that during image display with the same brightness, backlight power consumption can be reduced according to the particular improvement rate of transmittance. There are the further effects of power consumption being reduced by reductions in the driving voltage, and costs being reduced by use of a general-purpose driver lower in withstand voltage.

As described above, in the liquid crystal display panel of the present invention, as in the foregoing embodiment, the thickness "d" of the liquid crystal layer is kept constant between the transmission area TA and the reflection area RA, and no stepped portion is provided, which creates no ineffective area due to any stepped portions occurring in the pixel. This yields the advantageous effects of a wider area contributing to display, and hence, brighter display being obtained. Furthermore, a transflective liquid crystal display panel using an isotropic liquid crystal can be achieved without changing the strength of the electric field between the transmission area and the reflection area. Moreover, since no retardation film is required, there is an effect in that the liquid crystal display panel can be thinned down relative to a type that uses retardation films.

Making the Liquid Crystal Material

Next, isotropic liquid crystal materials highly applicable to a liquid crystal display panel are described below. Of isotropic liquid crystal materials, those exhibiting a high-polymer stabilization type of blue phase are known as the materials that are optically isotropic in three-dimensional fashion under no voltage. The materials exhibiting the high-polymer stabilization type of blue phase are known to be useable to obtain finally an isotropic liquid crystal material from a photocrosslink formed by irradiating, with ultraviolet (UV) light, any one of the non-liquid crystalline monomers shown in general formulae 1 to 3, the liquid crystalline monomer shown in general formula 4, the crosslinking agent shown in general formula 5, and the photopolymerization initiator shown in general formula 6.

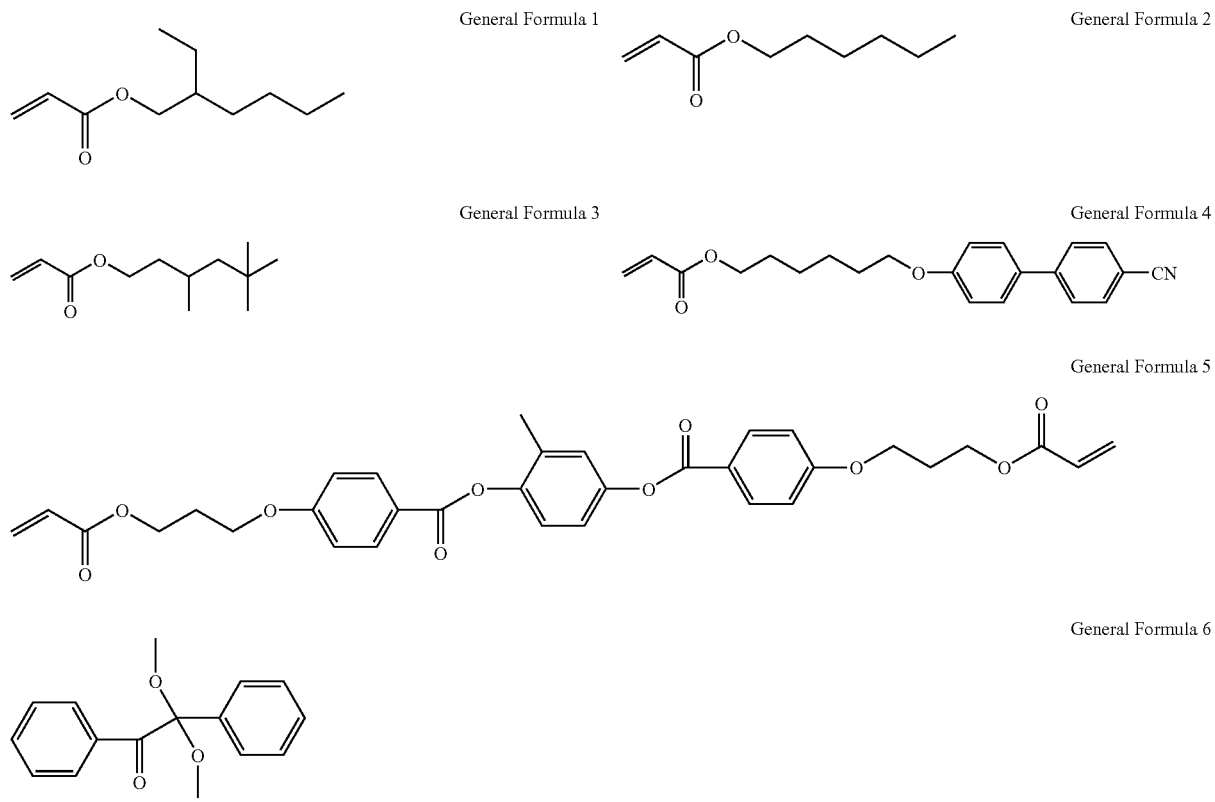

These liquid crystal materials, however, need UV irradiation to obtain the photocrosslink. For example, if the formation of a liquid crystal layer between a first transparent substrate and a second transparent substrate is followed by UV irradiation, since a color filter and/or other elements formed on the transparent substrates are small in UV transmittance, the problem arises that a sufficient amount of UV light does not reach the liquid crystal layer.

In order to solve this problem, an isotropic liquid crystal material is considered to be constructed in the manner below. That is to say, a thermal crosslink is formed by using any one of the non-liquid crystalline monomers shown in general formulae 7 to 9, the liquid crystalline monomer shown in general formula 10, and the epoxy-based thermal crosslinking material shown in general formula II, thereby to obtain the isotropic liquid crystal material shown in any one of general formulae 12 to 16.

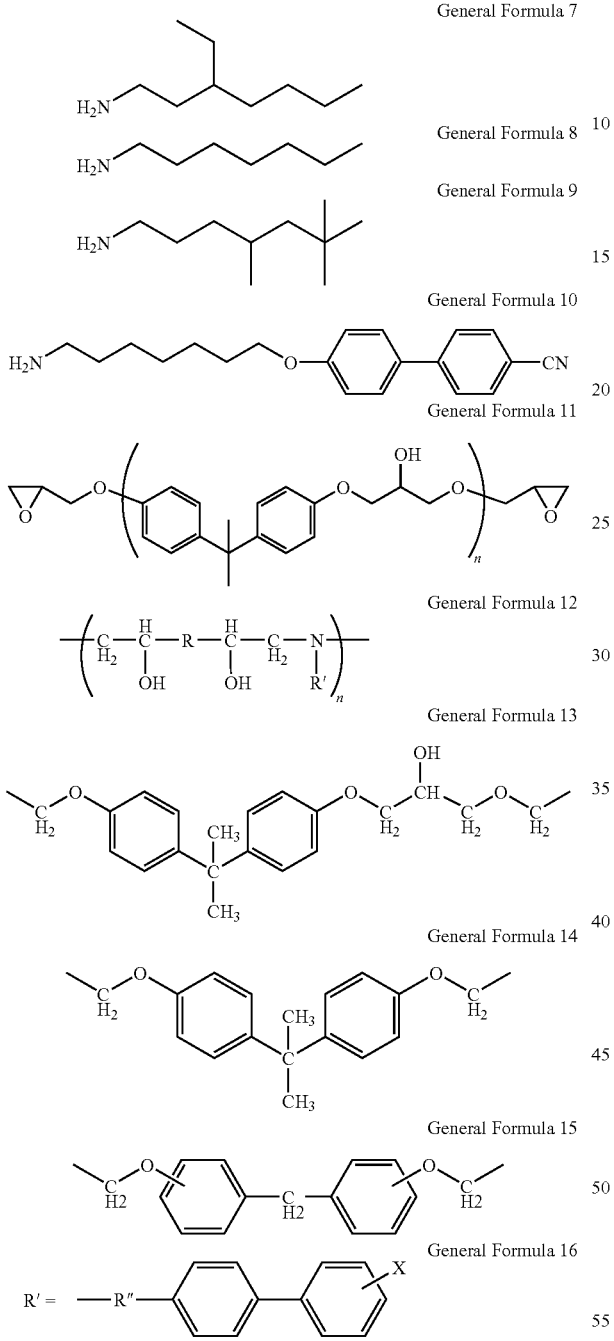

First, the compounds shown in above general formulae to 9, and 10, are mixed and then sealed in a liquid crystal cell. Next, the thermal crosslinking material shown in general formula 11 is sealed. After this, two-hour heating at about 50 degrees forms a thermal crosslink, thus making general formulae 12 to 16 obtainable. Adopting this composition makes it possible to generate an isotropic liquid crystal material without light irradiation. In addition, when a liquid crystal material with a thermal crosslinking property is used as in the studies, further using a polyimide resin to form a thin film on substrates between which the liquid crystal material is held in a sandwiched condition will securely anchor thermally crosslinked molecules on the substrates, hence making producible a liquid crystal display panel reduced in thermal sticking of images.

Thus, according to the present invention, a transflective liquid crystal display apparatus using an isotropic liquid crystal can be achieved.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A liquid crystal display apparatus comprising:
   a liquid crystal display panel including a first substrate, a second substrate, a liquid crystal layer held in a sandwiched condition between the first and second substrates, and a pixel electrode and a common electrode disposed on the second substrate in order to drive the liquid crystal layer;
   a backlight disposed on one face of the liquid crystal display panel;
   a first polarizer disposed on one face of the first substrate, at a side opposite to the second substrate; and
   a second polarizer disposed on one face of the second substrate, at a side opposite to the first substrate;
   wherein the liquid crystal layer has a property of generating optical anisotropy from an optical isotropic state when a voltage is applied;
   wherein the liquid crystal display panel includes a transmission area and a reflection area in one pixel;
   wherein in the reflection area, one of the pixel electrode and the common electrode is formed into a comb shape or includes a slit-shaped aperture in an electrode layer formed into a planar shape, with an other electrode of the pixel electrode and the common electrode being formed planarly on a different layer via an insulation layer;
   wherein in the transmission area, the pixel electrode and the common electrode are formed into a comb shape on the same layer, the pixel electrode and the common electrode being further disposed at alternate positions, such that an electric field formed in the liquid crystal layer according to a particular voltage difference between the pixel electrode and the common electrode is weaker in the reflection area than in the transmission area; and
   wherein a thickness of the liquid crystal layer in the transmission area and a thickness of the liquid crystal layer in the reflection area are constant.

2. The liquid crystal display apparatus according to claim 1,
   wherein in the reflection area, the other electrode which is formed planarly on the different layer via the insulation layer has a concavo-convex shape.

3. The liquid crystal display apparatus according to claim 1,
   wherein in the reflection area, the common electrode comprises aluminum or silver and is disposed between the pixel electrode and the second substrate.

4. The liquid crystal display apparatus according to claim 1, wherein a driving voltage is defined as a voltage difference between the pixel electrode and the common electrode;

wherein a birefringence Δn is defined as a birefringence induced in a parallel direction with respect to the substrate surface by applying a voltage to the pixel electrode and the common electrode and forming an electric field in the liquid crystal layer; and wherein when the driving voltage in the transmission area is the same as the driving voltage in the reflection area, a birefringence Δn in the reflection area is a half of a birefringence Δn in the transmission area.

5. The liquid crystal display apparatus according to claim 1, wherein the first polarizer and the second polarizer are circular polarizers.

6. The liquid crystal display apparatus according to claim 1, further comprising in the reflection area, an in-cell retardation layer disposed between the liquid crystal layer and the first or second substrate.

7. The liquid crystal display apparatus according to claim 1, further comprising:

in the reflection area, a reflective layer disposed between a first component and a second component, the first component being at the one of the pixel electrode and the common electrode, and the second component being the second substrate; and a polarizing layer disposed between the reflective layer and the liquid crystal layer at least in the reflection area.

* * * * *